United States Patent
Opris et al.

(10) Patent No.: US 10,060,757 B2
(45) Date of Patent: Aug. 28, 2018

(54) MEMS DEVICE QUADRATURE SHIFT CANCELLATION

(71) Applicant: Fairchild Semiconductor Corporation, San Jose, CA (US)

(72) Inventors: Ion Opris, San Jose, CA (US); Hai Tao, Sunnyvale, CA (US); Shungneng Lee, Sunnyvale, CA (US)

(73) Assignee: Fairchild Semiconductor Corporation, Phoenix, AZ (US)

( * ) Notice: Subject to any disclaimer, the term of this patent is extended or adjusted under 35 U.S.C. 154(b) by 1138 days.

(21) Appl. No.: 13/857,377

(22) Filed: Apr. 5, 2013

(65) Prior Publication Data

US 2013/0268228 A1 Oct. 10, 2013

Related U.S. Application Data

(60) Provisional application No. 61/620,653, filed on Apr. 5, 2012.

(51) Int. Cl.
*G01C 25/00* (2006.01)
*G01C 19/5776* (2012.01)
*G01C 19/5726* (2012.01)

(52) U.S. Cl.
CPC ......... *G01C 25/00* (2013.01); *G01C 19/5726* (2013.01); *G01C 19/5776* (2013.01)

(58) Field of Classification Search
CPC . G01C 25/00; G01C 19/5726; G01C 19/5776
(Continued)

(56) References Cited

U.S. PATENT DOCUMENTS

| 3,231,729 A | 1/1966 | Stern |
|---|---|---|
| 4,511,848 A | 4/1985 | Watson |

(Continued)

FOREIGN PATENT DOCUMENTS

| CN | 1068444 A | 1/1993 |
|---|---|---|
| CN | 1198587 A | 11/1998 |

(Continued)

OTHER PUBLICATIONS

"U.S. Appl. No. 12/849,742, Notice of Allowance dated Nov. 29, 2013", 7 pgs.

(Continued)

*Primary Examiner* — Kyle R Quigley
(74) *Attorney, Agent, or Firm* — Brake Hughes Bellermann LLP

(57) ABSTRACT

This document provides apparatus and methods for cancelation of quadrature error from a micro-electromechanical system (MEMS) device, such as a MEMS gyroscope. In certain examples, a quadrature correction apparatus can include a drive charge-to-voltage (C2V) converter configured to provide drive information of a proof mass of a MEMS gyroscope, a sense C2V converter configured to provide sense information of the proof mass, a phase-shift module configured to provide phase shift information of the drive information, a drive demodulator configured to receive the drive information and the phase shift information and to provide demodulated drive information, a sense demodulator configured to receive the sense information and the phase shift information and to provide demodulated sense information, and wherein the quadrature correction apparatus is configured to provide corrected sense information using the demodulated drive information and the demodulated sense information.

20 Claims, 3 Drawing Sheets

(58) Field of Classification Search
USPC ........ 702/104; 318/638; 73/504.12; 327/148
See application file for complete search history.

(56) References Cited

U.S. PATENT DOCUMENTS

| | | |
|---|---|---|
| 4,896,156 A | 1/1990 | Garverick |
| 5,481,914 A | 1/1996 | Ward |
| 5,487,305 A | 1/1996 | Ristic et al. |
| 5,491,604 A | 2/1996 | Nguyen et al. |
| 5,600,064 A | 2/1997 | Ward |
| 5,656,778 A | 8/1997 | Roszhart |
| 5,659,195 A | 8/1997 | Kaiser et al. |
| 5,703,292 A | 12/1997 | Ward |
| 5,723,790 A | 3/1998 | Andersson |
| 5,751,154 A | 5/1998 | Tsugai |
| 5,760,465 A | 6/1998 | Alcoe et al. |
| 5,765,046 A | 6/1998 | Watanabe et al. |
| 5,894,091 A | 4/1999 | Kubota |
| 5,912,499 A | 6/1999 | Diem et al. |
| 5,992,233 A | 11/1999 | Clark |
| 6,131,457 A | 10/2000 | Sato |
| 6,214,644 B1 | 4/2001 | Glenn |
| 6,230,566 B1 | 5/2001 | Lee et al. |
| 6,236,096 B1 | 5/2001 | Chang et al. |
| 6,250,157 B1 | 6/2001 | Touge |
| 6,253,612 B1 | 7/2001 | Lemkin et al. |
| 6,301,965 B1 | 10/2001 | Chu et al. |
| 6,351,996 B1 | 3/2002 | Nasiri et al. |
| 6,366,468 B1 | 4/2002 | Pan |
| 6,370,937 B2 | 4/2002 | Hsu |
| 6,390,905 B1 | 5/2002 | Korovin et al. |
| 6,501,282 B1 | 12/2002 | Dummermuth et al. |
| 6,504,385 B2 | 1/2003 | Hartwell |
| 6,516,651 B1 | 2/2003 | Geen |
| 6,553,835 B1 | 4/2003 | Hobbs et al. |
| 6,629,448 B1 | 10/2003 | Cvancara |
| 6,654,424 B1 | 11/2003 | Thomae et al. |
| 6,664,941 B2 | 12/2003 | Itakura et al. |
| 6,722,206 B2 | 4/2004 | Takada |
| 6,725,719 B2 | 4/2004 | Cardarelli |
| 6,737,742 B2 | 5/2004 | Sweterlitsch |
| 6,781,231 B2 | 8/2004 | Minervini et al. |
| 6,848,304 B2 | 2/2005 | Geen |
| 7,051,590 B1 | 5/2006 | Lemkin et al. |
| 7,054,778 B2 | 5/2006 | Geiger et al. |
| 7,093,487 B2 | 8/2006 | Mochida |
| 7,166,910 B2 | 1/2007 | Minervini et al. |
| 7,173,402 B2 | 2/2007 | Chen et al. |
| 7,202,552 B2 | 4/2007 | Zhe et al. |
| 7,210,351 B2 | 5/2007 | Lo et al. |
| 7,216,525 B2 | 5/2007 | Schroeder |
| 7,221,767 B2 | 5/2007 | Mullenborn et al. |
| 7,240,552 B2 | 7/2007 | Acar et al. |
| 7,258,011 B2 | 8/2007 | Nasiri et al. |
| 7,258,012 B2 | 8/2007 | Xie et al. |
| 7,266,349 B2 | 9/2007 | Kappes |
| 7,293,460 B2 | 11/2007 | Zarabadi et al. |
| 7,301,212 B1 | 11/2007 | Mian et al. |
| 7,305,880 B2 | 12/2007 | Caminada et al. |
| 7,339,384 B2 | 3/2008 | Peng et al. |
| 7,358,151 B2 | 4/2008 | Araki et al. |
| 7,436,054 B2 | 10/2008 | Zhe |
| 7,444,869 B2* | 11/2008 | Johnson ............ G01C 19/5719 73/504.12 |
| 7,449,355 B2 | 11/2008 | Lutz et al. |
| 7,451,647 B2 | 11/2008 | Matsuhisa et al. |
| 7,454,967 B2 | 11/2008 | Skurnik |
| 7,481,110 B2 | 1/2009 | Handrich et al. |
| 7,518,493 B2 | 4/2009 | Bryzek et al. |
| 7,539,003 B2 | 5/2009 | Ray |
| 7,544,531 B1 | 6/2009 | Grosjean |
| 7,565,839 B2 | 7/2009 | Stewart et al. |
| 7,595,648 B2 | 9/2009 | Ungaretti et al. |
| 7,600,428 B2 | 10/2009 | Robert et al. |
| 7,616,078 B2 | 11/2009 | Prandi et al. |
| 7,622,782 B2 | 11/2009 | Chu et al. |
| 7,694,563 B2 | 4/2010 | Durante et al. |
| 7,706,149 B2 | 4/2010 | Yang et al. |
| 7,781,249 B2 | 8/2010 | Laming et al. |
| 7,795,078 B2 | 9/2010 | Ramakrishna et al. |
| 7,817,331 B2 | 10/2010 | Moidu |
| 7,851,925 B2 | 12/2010 | Theuss et al. |
| 7,859,352 B2 | 12/2010 | Sutton |
| 7,950,281 B2 | 5/2011 | Hammerschmidt |
| 7,965,067 B2 | 6/2011 | Grönthal et al. |
| 8,004,354 B1 | 8/2011 | Pu et al. |
| 8,006,557 B2 | 8/2011 | Yin et al. |
| 8,026,771 B2 | 9/2011 | Kanai et al. |
| 8,037,755 B2 | 10/2011 | Nagata et al. |
| 8,113,050 B2 | 2/2012 | Acar et al. |
| 8,171,792 B2 | 5/2012 | Sameshima |
| 8,201,449 B2 | 6/2012 | Ohuchi et al. |
| 8,250,921 B2 | 8/2012 | Nasiri et al. |
| 8,256,290 B2 | 9/2012 | Mao |
| 8,375,789 B2 | 2/2013 | Prandi et al. |
| 8,378,756 B2 | 2/2013 | Huang et al. |
| 8,421,168 B2 | 4/2013 | Allen et al. |
| 8,476,970 B2 | 7/2013 | Mokhtar et al. |
| 8,497,746 B2 | 7/2013 | Visconti et al. |
| 8,508,290 B2 | 8/2013 | Elsayed et al. |
| 8,643,382 B2 | 2/2014 | Steele et al. |
| 8,661,898 B2 | 3/2014 | Watson |
| 8,710,599 B2 | 4/2014 | Marx et al. |
| 8,739,626 B2 | 6/2014 | Acar |
| 8,742,964 B2 | 6/2014 | Kleks et al. |
| 8,754,694 B2 | 6/2014 | Opris et al. |
| 8,763,459 B2 | 7/2014 | Brand et al. |
| 8,813,564 B2 | 8/2014 | Acar |
| 8,978,475 B2 | 3/2015 | Acar |
| 9,003,882 B1 | 4/2015 | Ayazi et al. |
| 9,006,846 B2 | 4/2015 | Bryzek et al. |
| 9,052,335 B2 | 6/2015 | Coronato et al. |
| 9,062,972 B2 | 6/2015 | Acar et al. |
| 9,069,006 B2 | 6/2015 | Opris et al. |
| 9,094,027 B2 | 7/2015 | Tao et al. |
| 9,095,072 B2 | 7/2015 | Bryzek et al. |
| 9,156,673 B2 | 10/2015 | Bryzek et al. |
| 9,246,018 B2 | 1/2016 | Acar |
| 9,278,845 B2 | 3/2016 | Acar |
| 9,278,846 B2 | 3/2016 | Acar |
| 9,352,961 B2 | 5/2016 | Acar et al. |
| 9,425,328 B2 | 8/2016 | Marx et al. |
| 9,444,404 B2 | 9/2016 | Opris et al. |
| 9,455,354 B2 | 9/2016 | Acar |
| 2001/0022106 A1 | 9/2001 | Kato et al. |
| 2002/0021059 A1 | 2/2002 | Knowles et al. |
| 2002/0083757 A1 | 7/2002 | Geen |
| 2002/0117728 A1 | 8/2002 | Brosnihan et al. |
| 2002/0178831 A1 | 12/2002 | Takada |
| 2002/0189352 A1 | 12/2002 | Reeds, III et al. |
| 2002/0196445 A1 | 12/2002 | Mcclary et al. |
| 2003/0033850 A1 | 2/2003 | Challoner et al. |
| 2003/0038415 A1 | 2/2003 | Anderson et al. |
| 2003/0061878 A1 | 4/2003 | Pinson |
| 2003/0196475 A1 | 10/2003 | Wyse |
| 2003/0200807 A1 | 10/2003 | Hulsing, II |
| 2003/0222337 A1 | 12/2003 | Stewart |
| 2004/0051508 A1 | 3/2004 | Hamon et al. |
| 2004/0085096 A1 | 5/2004 | Ward et al. |
| 2004/0085784 A1 | 5/2004 | Salama et al. |
| 2004/0088127 A1* | 5/2004 | M'Closkey ............ G01C 19/56 702/96 |
| 2004/0119137 A1 | 6/2004 | Leonardi et al. |
| 2004/0177689 A1 | 9/2004 | Cho et al. |
| 2004/0211258 A1 | 10/2004 | Geen |
| 2004/0219340 A1 | 11/2004 | McNeil et al. |
| 2004/0231420 A1 | 11/2004 | Xie et al. |
| 2004/0251793 A1 | 12/2004 | Matushisa |
| 2005/0005698 A1 | 1/2005 | McNeil et al. |
| 2005/0072239 A1 | 4/2005 | Longsdorf et al. |
| 2005/0097957 A1 | 5/2005 | Mcneil et al. |
| 2005/0139005 A1 | 6/2005 | Geen |
| 2005/0189635 A1 | 9/2005 | Humpston et al. |
| 2005/0274181 A1 | 12/2005 | Kutsuna et al. |

(56) References Cited

U.S. PATENT DOCUMENTS

| | | |
|---|---|---|
| 2006/0032308 A1 | 2/2006 | Acar et al. |
| 2006/0034472 A1 | 2/2006 | Bazarjani et al. |
| 2006/0043608 A1 | 3/2006 | Bernier et al. |
| 2006/0044065 A1 | 3/2006 | Ishida |
| 2006/0097331 A1 | 5/2006 | Hattori |
| 2006/0112764 A1 | 6/2006 | Higuchi |
| 2006/0137457 A1 | 6/2006 | Zdeblick |
| 2006/0141786 A1 | 6/2006 | Boezen et al. |
| 2006/0207328 A1 | 9/2006 | Zarabadi et al. |
| 2006/0213265 A1 | 9/2006 | Weber et al. |
| 2006/0213266 A1 | 9/2006 | French et al. |
| 2006/0213268 A1 | 9/2006 | Asami et al. |
| 2006/0246631 A1 | 11/2006 | Lutz et al. |
| 2006/0283245 A1 | 12/2006 | Konno et al. |
| 2007/0013052 A1 | 1/2007 | Zhe et al. |
| 2007/0034005 A1 | 2/2007 | Acar et al. |
| 2007/0040231 A1 | 2/2007 | Harney et al. |
| 2007/0042606 A1 | 2/2007 | Wang et al. |
| 2007/0047744 A1 | 3/2007 | Karney et al. |
| 2007/0071268 A1 | 3/2007 | Harney et al. |
| 2007/0085544 A1 | 4/2007 | Viswanathan |
| 2007/0099327 A1 | 5/2007 | Hartzell et al. |
| 2007/0113653 A1 | 5/2007 | Nasiri et al. |
| 2007/0114643 A1 | 5/2007 | DCamp et al. |
| 2007/0165888 A1 | 7/2007 | Weigold |
| 2007/0180908 A1 | 8/2007 | Seeger et al. |
| 2007/0205492 A1 | 9/2007 | Wang |
| 2007/0214883 A1 | 9/2007 | Durante et al. |
| 2007/0214891 A1 | 9/2007 | Robert et al. |
| 2007/0220973 A1 | 9/2007 | Acar |
| 2007/0222021 A1 | 9/2007 | Yao |
| 2007/0240486 A1* | 10/2007 | Moore ............... G01C 21/16 73/1.37 |
| 2007/0284682 A1 | 12/2007 | Laming et al. |
| 2008/0022762 A1 | 1/2008 | Skurnik |
| 2008/0049230 A1 | 2/2008 | Chin et al. |
| 2008/0079120 A1 | 4/2008 | Foster et al. |
| 2008/0079444 A1 | 4/2008 | Denison |
| 2008/0081398 A1 | 4/2008 | Lee et al. |
| 2008/0083958 A1 | 4/2008 | Wei et al. |
| 2008/0083960 A1 | 4/2008 | Chen et al. |
| 2008/0092652 A1 | 4/2008 | Acar |
| 2008/0122439 A1 | 5/2008 | Burdick et al. |
| 2008/0157238 A1 | 7/2008 | Hsiao |
| 2008/0157301 A1 | 7/2008 | Ramakrishna et al. |
| 2008/0169811 A1 | 7/2008 | Viswanathan |
| 2008/0202237 A1 | 8/2008 | Hammerschmidt |
| 2008/0245148 A1 | 10/2008 | Fukumoto |
| 2008/0247585 A1 | 10/2008 | Leidl et al. |
| 2008/0251866 A1 | 10/2008 | Belt et al. |
| 2008/0253057 A1 | 10/2008 | Rijks et al. |
| 2008/0284365 A1* | 11/2008 | Sri-Jayantha ...... G11B 7/08505 318/638 |
| 2008/0290756 A1 | 11/2008 | Huang |
| 2008/0302559 A1 | 12/2008 | Leedy |
| 2008/0314147 A1 | 12/2008 | Nasiri |
| 2009/0007661 A1 | 1/2009 | Nasiri et al. |
| 2009/0056443 A1 | 3/2009 | Netzer |
| 2009/0064780 A1 | 3/2009 | Coronato et al. |
| 2009/0064781 A1 | 3/2009 | Ayazi et al. |
| 2009/0072663 A1 | 3/2009 | Ayazi et al. |
| 2009/0085191 A1 | 4/2009 | Najafi et al. |
| 2009/0114016 A1 | 5/2009 | Nasiri et al. |
| 2009/0140606 A1 | 6/2009 | Huang |
| 2009/0166827 A1 | 7/2009 | Foster et al. |
| 2009/0175477 A1 | 7/2009 | Suzuki et al. |
| 2009/0183570 A1 | 7/2009 | Acar et al. |
| 2009/0194829 A1 | 8/2009 | Chung et al. |
| 2009/0217757 A1 | 9/2009 | Nozawa |
| 2009/0263937 A1 | 10/2009 | Ramakrishna et al. |
| 2009/0266163 A1 | 10/2009 | Ohuchi et al. |
| 2009/0272189 A1 | 11/2009 | Acar et al. |
| 2010/0019393 A1 | 1/2010 | Hsieh et al. |
| 2010/0024548 A1 | 2/2010 | Cardarelli |
| 2010/0038733 A1 | 2/2010 | Minervini |
| 2010/0044853 A1 | 2/2010 | Dekker et al. |
| 2010/0052082 A1 | 3/2010 | Lee |
| 2010/0058864 A1 | 3/2010 | Hsu et al. |
| 2010/0072626 A1 | 3/2010 | Theuss et al. |
| 2010/0077858 A1 | 4/2010 | Kawakubo et al. |
| 2010/0089154 A1 | 4/2010 | Ballas et al. |
| 2010/0122579 A1 | 5/2010 | Hsu et al. |
| 2010/0126269 A1 | 5/2010 | Coronato et al. |
| 2010/0132461 A1 | 6/2010 | Hauer et al. |
| 2010/0155863 A1 | 6/2010 | Weekamp |
| 2010/0194615 A1 | 8/2010 | Lu |
| 2010/0206074 A1 | 8/2010 | Yoshida et al. |
| 2010/0212425 A1 | 8/2010 | Hsu et al. |
| 2010/0224004 A1 | 9/2010 | Suminto et al. |
| 2010/0231452 A1 | 9/2010 | Babakhani et al. |
| 2010/0236327 A1 | 9/2010 | Mao et al. |
| 2010/0263445 A1 | 10/2010 | Hayner et al. |
| 2010/0294039 A1 | 11/2010 | Geen |
| 2011/0023605 A1 | 2/2011 | Tripoli et al. |
| 2011/0030473 A1 | 2/2011 | Acar |
| 2011/0030474 A1 | 2/2011 | Kuang et al. |
| 2011/0031565 A1 | 2/2011 | Marx et al. |
| 2011/0074389 A1 | 3/2011 | Knierim et al. |
| 2011/0094302 A1 | 4/2011 | Schofield et al. |
| 2011/0120221 A1 | 5/2011 | Yoda |
| 2011/0121413 A1 | 5/2011 | Allen et al. |
| 2011/0146403 A1 | 6/2011 | Rizzo Piazza Roncoroni et al. |
| 2011/0147859 A1 | 6/2011 | Tanaka et al. |
| 2011/0179868 A1 | 7/2011 | Kaino et al. |
| 2011/0192226 A1* | 8/2011 | Hayner ............... G01C 19/5776 73/504.12 |
| 2011/0201197 A1 | 8/2011 | Nilsson et al. |
| 2011/0234312 A1 | 9/2011 | Lachhwani et al. |
| 2011/0265564 A1 | 11/2011 | Acar et al. |
| 2011/0285445 A1 | 11/2011 | Huang et al. |
| 2011/0316048 A1 | 12/2011 | Ikeda et al. |
| 2012/0126349 A1 | 5/2012 | Horning et al. |
| 2012/0162947 A1 | 6/2012 | O'donnell et al. |
| 2012/0191398 A1 | 7/2012 | Murakami et al. |
| 2012/0326248 A1 | 12/2012 | Daneman et al. |
| 2013/0051586 A1 | 2/2013 | Stephanou et al. |
| 2013/0098153 A1 | 4/2013 | Trusov et al. |
| 2013/0099836 A1* | 4/2013 | Shaeffer ............. G01C 19/5776 327/148 |
| 2013/0139591 A1 | 6/2013 | Acar |
| 2013/0139592 A1 | 6/2013 | Acar |
| 2013/0192364 A1 | 8/2013 | Acar |
| 2013/0192369 A1 | 8/2013 | Acar et al. |
| 2013/0199263 A1 | 8/2013 | Egretzberger et al. |
| 2013/0199294 A1 | 8/2013 | Townsend et al. |
| 2013/0221457 A1 | 8/2013 | Conti et al. |
| 2013/0247666 A1 | 9/2013 | Acar |
| 2013/0247668 A1 | 9/2013 | Bryzek |
| 2013/0250532 A1 | 9/2013 | Bryzek et al. |
| 2013/0257487 A1 | 10/2013 | Opris et al. |
| 2013/0263641 A1 | 10/2013 | Opris et al. |
| 2013/0263665 A1 | 10/2013 | Opris et al. |
| 2013/0265070 A1 | 10/2013 | Kleks et al. |
| 2013/0265183 A1 | 10/2013 | Kleks et al. |
| 2013/0268227 A1 | 10/2013 | Opris et al. |
| 2013/0269413 A1 | 10/2013 | Tao et al. |
| 2013/0270657 A1 | 10/2013 | Acar et al. |
| 2013/0270660 A1 | 10/2013 | Bryzek et al. |
| 2013/0271228 A1 | 10/2013 | Tao et al. |
| 2013/0277772 A1 | 10/2013 | Bryzek et al. |
| 2013/0277773 A1 | 10/2013 | Bryzek et al. |
| 2013/0283911 A1 | 10/2013 | Ayazi et al. |
| 2013/0298671 A1 | 11/2013 | Acar et al. |
| 2013/0328139 A1 | 12/2013 | Acar |
| 2013/0341737 A1 | 12/2013 | Bryzek et al. |
| 2014/0070339 A1 | 3/2014 | Marx |
| 2014/0190258 A1 | 7/2014 | Donadel et al. |
| 2014/0275857 A1 | 9/2014 | Toth et al. |
| 2014/0306773 A1 | 10/2014 | Kim |
| 2015/0059473 A1 | 3/2015 | Jia |
| 2015/0114112 A1 | 4/2015 | Valzasina et al. |
| 2015/0185012 A1 | 7/2015 | Acar |

(56) References Cited

U.S. PATENT DOCUMENTS

| | | | |
|---|---|---|---|
| 2016/0003618 A1 | 1/2016 | Boser et al. | |
| 2016/0161256 A1 | 6/2016 | Lee et al. | |
| 2016/0264404 A1 | 9/2016 | Acar | |

FOREIGN PATENT DOCUMENTS

| | | |
|---|---|---|
| CN | 1206110 A | 1/1999 |
| CN | 1221210 A | 6/1999 |
| CN | 1272622 A | 11/2000 |
| CN | 102156201 A | 8/2001 |
| CN | 1389704 A | 1/2003 |
| CN | 1532524 A | 9/2004 |
| CN | 1595062 A | 3/2005 |
| CN | 1595063 A | 3/2005 |
| CN | 1603842 A | 4/2005 |
| CN | 1617334 A | 5/2005 |
| CN | 1659810 A | 8/2005 |
| CN | 1693181 A | 11/2005 |
| CN | 1780732 A | 5/2006 |
| CN | 1813192 A | 8/2006 |
| CN | 1816747 A | 8/2006 |
| CN | 1818552 A | 8/2006 |
| CN | 1886669 A | 12/2006 |
| CN | 1905167 A | 1/2007 |
| CN | 1948906 A | 4/2007 |
| CN | 101038299 A | 9/2007 |
| CN | 101044684 A | 9/2007 |
| CN | 101059530 A | 10/2007 |
| CN | 101067555 A | 11/2007 |
| CN | 101069099 A | 11/2007 |
| CN | 101078736 A | 11/2007 |
| CN | 101171665 A | 4/2008 |
| CN | 101180516 A | 5/2008 |
| CN | 101198874 A | 6/2008 |
| CN | 101213461 A | 7/2008 |
| CN | 101217263 A | 7/2008 |
| CN | 101239697 A | 8/2008 |
| CN | 101257000 A | 9/2008 |
| CN | 101270988 A | 9/2008 |
| CN | 101316462 A | 12/2008 |
| CN | 101329446 A | 12/2008 |
| CN | 101426718 A | 5/2009 |
| CN | 101459866 A | 6/2009 |
| CN | 101519183 A | 9/2009 |
| CN | 101520327 A | 9/2009 |
| CN | 101561275 A | 10/2009 |
| CN | 101634662 A | 1/2010 |
| CN | 101638211 A | 2/2010 |
| CN | 101639487 A | 2/2010 |
| CN | 101666813 A | 3/2010 |
| CN | 101738496 A | 6/2010 |
| CN | 101813480 A | 8/2010 |
| CN | 101839718 A | 9/2010 |
| CN | 101055180 A | 10/2010 |
| CN | 101855516 A | 10/2010 |
| CN | 101858928 A | 10/2010 |
| CN | 101916754 A | 12/2010 |
| CN | 101922934 A | 12/2010 |
| CN | 201688848 U | 12/2010 |
| CN | 102109345 A | 6/2011 |
| CN | 102332894 A | 1/2012 |
| CN | 102337541 A | 2/2012 |
| CN | 102364671 A | 2/2012 |
| CN | 102597699 A | 7/2012 |
| CN | 103209922 A | 7/2013 |
| CN | 103210278 A | 7/2013 |
| CN | 103221331 A | 7/2013 |
| CN | 103221332 A | 7/2013 |
| CN | 103221333 A | 7/2013 |
| CN | 103221778 A | 7/2013 |
| CN | 103221779 A | 7/2013 |
| CN | 103221795 A | 7/2013 |
| CN | 103238075 A | 8/2013 |
| CN | 103363969 A | 10/2013 |
| CN | 103363983 A | 10/2013 |
| CN | 103364590 A | 10/2013 |
| CN | 103364593 A | 10/2013 |
| CN | 103368503 A | 10/2013 |
| CN | 103368562 A | 10/2013 |
| CN | 103368577 A | 10/2013 |
| CN | 103376099 A | 10/2013 |
| CN | 103376102 A | 10/2013 |
| CN | 203261317 U | 10/2013 |
| CN | 103403495 A | 11/2013 |
| CN | 203275441 U | 11/2013 |
| CN | 203275442 U | 11/2013 |
| CN | 203301454 U | 11/2013 |
| CN | 203349832 U | 12/2013 |
| CN | 203349834 U | 12/2013 |
| CN | 103663344 A | 3/2014 |
| CN | 203683082 U | 7/2014 |
| CN | 203719664 U | 7/2014 |
| CN | 104094084 A | 10/2014 |
| CN | 104105945 A | 10/2014 |
| CN | 104220840 A | 12/2014 |
| CN | 104272062 A | 1/2015 |
| CN | 103221778 B | 3/2016 |
| CN | 104272062 B | 5/2016 |
| DE | 112011103124 T5 | 12/2013 |
| DE | 102013014881 A1 | 3/2014 |
| EP | 0638782 A1 | 2/1995 |
| EP | 1055910 A1 | 11/2000 |
| EP | 1335185 A1 | 8/2003 |
| EP | 1460380 A1 | 9/2004 |
| EP | 1521086 A1 | 4/2005 |
| EP | 1688705 A2 | 8/2006 |
| EP | 1832841 A1 | 9/2007 |
| EP | 1860402 A1 | 11/2007 |
| EP | 2053413 A1 | 4/2009 |
| EP | 2096759 A1 | 9/2009 |
| EP | 2259019 A1 | 12/2010 |
| EP | 2466257 A1 | 6/2012 |
| EP | 2616772 B1 | 6/2016 |
| EP | 2647593 B1 | 8/2016 |
| JP | 0989927 A | 4/1997 |
| JP | 09089927 A | 4/1997 |
| JP | 10239347 A | 9/1998 |
| JP | 1164002 A | 3/1999 |
| JP | 2000046560 A | 2/2000 |
| JP | 2005024310 A | 1/2005 |
| JP | 2005114394 A | 4/2005 |
| JP | 2005294462 A | 10/2005 |
| JP | 3882972 B2 | 2/2007 |
| JP | 2007024864 A | 2/2007 |
| JP | 2008294455 A | 12/2008 |
| JP | 2009075097 A | 4/2009 |
| JP | 2009186213 A | 8/2009 |
| JP | 2009192458 A | 8/2009 |
| JP | 2009260348 A | 11/2009 |
| JP | 2010025898 A | 2/2010 |
| JP | 2010506182 A | 2/2010 |
| KR | 1020110055449 A1 | 5/2011 |
| KR | 1020130052652 A | 5/2013 |
| KR | 1020130052653 A | 5/2013 |
| KR | 1020130054441 A | 5/2013 |
| KR | 1020130055693 A | 5/2013 |
| KR | 1020130057485 A | 5/2013 |
| KR | 1020130060338 A | 6/2013 |
| KR | 1020130061181 A | 6/2013 |
| KR | 101311966 B1 | 9/2013 |
| KR | 1020130097209 A | 9/2013 |
| KR | 101318810 B1 | 10/2013 |
| KR | 1020130037462 A | 10/2013 |
| KR | 1020130112789 A | 10/2013 |
| KR | 1020130112792 A | 10/2013 |
| KR | 1020130112804 A | 10/2013 |
| KR | 1020130113385 A | 10/2013 |
| KR | 1020130113386 A | 10/2013 |
| KR | 1020130113391 A | 10/2013 |
| KR | 1020130116189 A | 10/2013 |
| KR | 1020130116212 A | 10/2013 |
| KR | 101332701 B1 | 11/2013 |
| KR | 1020130139914 A | 12/2013 |
| KR | 1020130142116 A | 12/2013 |

(56) References Cited

FOREIGN PATENT DOCUMENTS

| KR | 101352827 B1 | 1/2014 |
|---|---|---|
| KR | 1020140034713 A | 3/2014 |
| TW | I255341 B | 5/2006 |
| WO | WO-9311415 A1 | 6/1993 |
| WO | WO-9503534 A1 | 2/1995 |
| WO | WO-0107875 A1 | 2/2001 |
| WO | WO-0175455 A2 | 10/2001 |
| WO | WO-2008014246 A1 | 1/2008 |
| WO | WO-2008059757 A1 | 5/2008 |
| WO | WO-2008087578 A2 | 7/2008 |
| WO | WO-2009038924 A2 | 3/2009 |
| WO | WO-2009050578 A2 | 4/2009 |
| WO | WO-2009156485 A1 | 12/2009 |
| WO | WO-2011016859 A2 | 2/2011 |
| WO | WO-2011016859 A3 | 2/2011 |
| WO | WO-2011107542 A2 | 9/2011 |
| WO | WO-2012037492 A2 | 3/2012 |
| WO | WO-2012037492 A3 | 3/2012 |
| WO | WO-2012037501 A2 | 3/2012 |
| WO | WO-2012037501 A3 | 3/2012 |
| WO | WO-2012037536 A2 | 3/2012 |
| WO | WO-2012037537 A2 | 3/2012 |
| WO | WO-2012037538 A2 | 3/2012 |
| WO | WO-2012037539 A1 | 3/2012 |
| WO | WO-2012037539 A9 | 3/2012 |
| WO | WO-2012037540 A2 | 3/2012 |
| WO | WO-2012040194 A1 | 3/2012 |
| WO | WO-2012040211 A2 | 3/2012 |
| WO | WO-2012040245 A2 | 3/2012 |
| WO | WO-2012040245 A3 | 3/2012 |
| WO | WO-2013115967 A1 | 8/2013 |
| WO | WO-2013116356 A1 | 8/2013 |
| WO | WO-2013116514 A1 | 8/2013 |
| WO | WO-2013116522 A1 | 8/2013 |

OTHER PUBLICATIONS

"U.S. Appl. No. 12/849,787, Notice of Allowance dated Dec. 11, 2013", 9 pgs.
"U.S. Appl. No. 13/362,955, Response filed Feb. 17, 2014 to Restriction Requirement dated Dec. 17, 2013", 9 pgs.
"U.S. Appl. No. 13/362,955, Restriction Requirement dated Dec. 17, 2013", 6 pgs.
"U.S. Appl. No. 13/363,537, Non Final Office Action dated Feb. 6, 2014", 10 pgs.
"U.S. Appl. No. 13/742,942, Notice of Allowance dated Jan. 28, 2014", 9 pgs.
"U.S. Appl. No. 13/746,016, Notice of Allowance dated Jan. 17, 2014", 10 pgs.
"U.S. Appl. No. 13/755,841, Restriction Requirement dated Feb. 21, 2014", 6 pgs.
"Chinese Application Serial No. 201180053926.1, Office Action dated Jan. 13, 2014", 7 pgs.
"Chinese Application Serial No. 201180054796.3, Office Action dated Jan. 16, 2014", 8 pgs.
"Chinese Application Serial No. 201180055029.4, Office Action dated Jan. 13, 2014", 7 pgs.
"Chinese Application Serial No. 201320172366.8, Office Action dated Jan. 30, 2014", 3 pgs.
"Chinese Application Serial No. 201320172366.8, Office Action dated Oct. 25, 2013", 8 pgs.
"Chinese Application Serial No. 201320172366.8, Response filed Dec. 24, 2013 to Office Action dated Oct. 25, 2013", 11 pgs.
"Chinese Application Serial No. 201320565239.4, Office Action dated Jan. 16, 2014", w/English Translation, 3 pgs.
"European Application Serial No. 10806751.3, Extended European Search Report dated Jan. 7, 2014", 7 pgs.
"Korean Application Serial No. 10-2013-0109990, Amendment filed Dec. 10, 2013", 4 pgs.
"Korean Application Serial No. 10-2013-7009775, Office Action dated Dec. 27, 2013", 8 pgs.
"Korean Application Serial No. 10-2013-7009775, Response filed Oct. 29, 2013 to Office Action dated Sep. 17, 2013", w/English Claims, 23 pgs.
"Korean Application Serial No. 10-2013-7009777, Office Action dated Jan. 27, 2014", 5 pgs.
"Korean Application Serial No. 10-2013-7009777, Response filed Nov. 5, 2013 to Office Action dated Sep. 17, 2013", 11 pgs.
"Korean Application Serial No. 10-2013-7009788, Office Action dated Dec. 27, 2013", w/English Translation, 10 pgs.
"Korean Application Serial No. 10-2013-7009788, Response filed Oct. 29, 2013 to Office Action dated Aug. 29, 2013", w/English Claims, 22 pgs.
"U.S. Appl. No. 12/849,742, Non Final Office Action dated Mar. 28, 2013", 9 pgs.
"U.S. Appl. No. 12/849,742, Non Final Office Action dated Aug. 23, 2012", 9 pgs.
"U.S. Appl. No. 12/849,787, Response filed Feb. 4, 2013 to Restriction Requirement dated Oct. 4, 2012", 7 pgs.
"U.S. Appl. No. 12/849,787, Restriction Requirement dated Oct. 4, 2012", 5 pgs.
"Application Serial No. PCT/US2011/052006, International Republished Application dated Jun. 7, 2012", 1 pg.
"Application Serial No. PCT/US2011/052417, International Republished Application dated Jun. 7, 2012", 1 pg.
"International Application Serial No. PCT/US2010/002166, International Preliminary Report on Patentability dated Feb. 16, 2012", 6 pgs.
"International Application Serial No. PCT/US2010/002166, International Search Report dated Feb. 28, 2011", 3 pgs.
"International Application Serial No. PCT/US2010/002166, Written Opinion dated Feb. 28, 2011",4 pgs.
"International Application Serial No. PCT/US2011/051994, International Search Report dated Apr. 16, 2012", 3 pgs.
"International Application Serial No. PCT/US2011/051994, Written Opinion dated Apr. 16, 2012", 6 pgs.
"International Application Serial No. PCT/US2011/052006, International Preliminary Report on Patentability dated Mar. 28, 2013", 7 pgs.
"International Application Serial No. PCT/US2011/052006, Search Report dated Apr. 16, 2012", 3 pgs.
"International Application Serial No. PCT/US2011/052006, Written Opinion dated Apr. 16, 2012", 5 pgs.
"International Application Serial No. PCT/US2011/052059, International Preliminary Report on Patentability dated Jan. 22, 2013", 14 pgs.
"International Application Serial No. PCT/US2011/052059, Search Report dated Apr. 20, 2012", 4 pgs.
"International Application Serial No. PCT/US2011/052059, Written Opinion dated Apr. 20, 2012", 7 pgs.
"International Application Serial No. PCT/US2011/052060, International Preliminary Report on Patentability dated Jan. 22, 2013", 12 pgs.
"International Application Serial No. PCT/US2011/052060, International Search Report dated Apr. 20, 2012", 3 pgs.
"International Application Serial No. PCT/US2011/052060, Written Opinion dated Apr. 20, 2012", 7 pgs.
"International Application Serial No. PCT/US2011/052061, International Preliminary Report on Patentability dated Mar. 28, 2013", 6 pgs.
"International Application Serial No. PCT/US2011/052061, International Search Report dated Apr. 10, 2012", 3 pgs.
"International Application Serial No. PCT/US2011/052061, Written Opinion dated Apr. 10, 2012", 4 pgs.
"International Application Serial No. PCT/US2011/052064, International Preliminary Report on Patentability dated Mar. 28, 2013", 5 pgs.
"International Application Serial No. PCT/US2011/052064, Search Report dated Feb. 29, 2012", 3 pgs.
"International Application Serial No. PCT/US2011/052064, Written Opinion dated Feb. 29, 2012", 3 pgs.
"International Application Serial No. PCT/US2011/052065, International Preliminary Report on Patentability dated Mar. 28, 2013", 7 pgs.

(56) References Cited

OTHER PUBLICATIONS

"International Application Serial No. PCT/US2011/052065, International Search Report dated Apr. 10, 2012", 3 pgs.
"International Application Serial No. PCT/US2011/052065, Written Opinion dated Apr. 10, 2012", 5 pgs.
"International Application Serial No. PCT/US2011/052369, International Search Report dated Apr. 24, 2012", 6 pgs.
"International Application Serial No. PCT/US2011/052369, Written Opinion dated Apr. 24, 2012", 3 pgs.
"International Application Serial No. PCT/US2011/052417, International Preliminary Report on Patentability dated Apr. 4, 2013", 6 pgs.
"International Application Serial No. PCT/US2011/052417, International Search Report dated Apr. 23, 2012", 5 pgs.
"International Application Serial No. PCT/US2011/052417, Written Opinion dated Apr. 23, 2012", 4 pgs.
Beyne, E, et al., "Through-silicon via and die stacking technologies for microsystems-integration", IEEE International Electron Devices Meeting, 2008. IEDM 2008., (Dec. 2008), 1-4.
Cabruja, Enric, et al., "Piezoresistive Accelerometers for MCM-Package-Part II", The Packaging Journal of Microelectromechanical Systems. vol. 14, No. 4, (Aug. 2005), 806-811.
Ezekwe, Chinwuba David, "Readout Techniques for High-Q Micromachined Vibratory Rate Gyroscopes", Electrical Engineering and Computer Sciences University of California at Berkeley, Technical Report No. UCB/EECS-2007-176, http://www.eecs.berkeley.edu/Pubs/TechRpts/2007/EECS-2007-176.html, (Dec. 21, 2007), 94 pgs.
Rimskog, Magnus, "Through Wafer Via Technology for MEMS and 3D Integration", 32nd IEEE/CPMT International Electronic Manufacturing Technology Symposium, 2007. IEMT '07., (2007), 286-289.
U.S. Appl. No. 14/217,842, filed Mar. 18, 2014, Apparatus and Methods for PLL-Based Gyroscope Gain Control, Quadrature Cancellation and Demodulation.
"U.S. Appl. No. 13/362,955, Notice of Allowance dated Feb. 25, 2015", 8 pgs.
"U.S. Appl. No. 13/362,955, Response filed Jan. 16, 2015 to Final Office Action dated Nov. 19, 2014", 9 pgs.
"U.S. Appl. No. 13/363,537, Corrected Notice of Allowance dated Jan. 28, 2015", 2 pgs.
"U.S. Appl. No. 13/742,994, Non Final Office Action dated May 1, 2015", 20 pgs.
"U.S. Appl. No. 13/755,953, Non Final Office Action dated May 14, 2015", 11 pgs.
"U.S. Appl. No. 13/755,953, Response filed May 4, 2015 to Restrictiion Requirement dated Mar. 3, 2015", 7 pgs.
"U.S. Appl. No. 13/755,953, Restriction Requirement dated Mar. 3, 2015", 6 pgs.
"U.S. Appl. No. 13/765,068, Notice of Allowance dated May 7, 2015", 12 pgs.
"U.S. Appl. No. 13/813,443, Restriction Requirement dated Apr. 29, 2015", 6 pgs.
"U.S. Appl. No. 13/821,586, Non Final Office Action dated Jan. 15, 2015", 8 pgs.
"U.S. Appl. No. 13/821,586, Response filed May 15, 2015 to Non Final Office Action dated Jan. 15, 2015", 12 pgs.
"U.S. Appl. No. 13/821,589, Final Office Action dated Mar. 12, 2015", 13 pgs.
"U.S. Appl. No. 13/821,589, response filed May 12, 2015 to final office action dated Mar. 12, 2015", 12 pgs.
"U.S. Appl. No. 13/821,598, Response filed Feb. 20, 2015 to Non Final Office Action dated Nov. 20, 2014", 12 pgs.
"U.S. Appl. No. 13/821,609, Notice of Allowance dated Mar. 23, 2015", 11 pgs.
"U.S. Appl. No. 13/821,609, Response filed Feb. 13, 2015 to Restriction Requirement dated Dec. 15, 2014", 6 pgs.
"U.S. Appl. No. 13/821,609, Restriction Requirement dated Dec. 15, 2014", 7 pgs.
"U.S. Appl. No. 13/821,612, Notice of Allowance dated Dec. 10, 2014", 8 pgs.
"U.S. Appl. No. 13/821,842, Non Final Office Action dated Mar. 18, 2015", 20 pgs.
"U.S. Appl. No. 13/821,853, Non Final Office Action dated Feb. 18, 2015", 15 pgs.
"U.S. Appl. No. 13/821,853, Response filed Dec. 1, 2014 to Non Final Office Action dated Jul. 30, 2014", 10 pgs.
"U.S. Appl. No. 13/860,761, Advisory Action dated Mar. 25, 2015", 3 pgs.
"U.S. Appl. No. 13/860,761, Final Office Action dated Jan. 15, 2015", 14 pgs.
"U.S. Appl. No. 13/860,761, Notice of Allowance dated Apr. 28, 2015", 8 pgs.
"U.S. Appl. No. 13/860,761, Response filed Mar. 16, 2015 to Final Office Action dated Jan. 16, 2015", 12 pgs.
"U.S. Appl. No. 13/860,761, Response filed Apr. 16, 2015 to Advisory Action dated Mar. 25, 2015", 11 pgs.
"U.S. Appl. No. 13/860,761, Response filed Dec. 19, 2014 to Non Final Office Action dated Aug. 19, 2014", 12 pgs.
"U.S. Appl. No. 14/658,579, Prliminary Amendment filed Mar. 18, 2015", 8 pgs.
"Chinese Application Serial No. 201180054796.3, Office Action dated Jan. 30, 2015", with English translation of claims, 5 pgs.
"Chinese Application Serial No. 201180054796.3, Response filed Nov. 19, 2014 to Office Action dated Sep. 4, 2014", with English translation of claims, 7 pgs.
"Chinese Application Serial No. 201180054796.3, Response filed Apr. 14, 2015 to Office Action dated Jan. 30, 2015", w/ English Claims, 30 pgs.
"Chinese Application Serial No. 201180055309.5, Office Action dated Jan. 8, 2015", with English translation of claims, 5 pgs.
"Chinese Application Serial No. 201180055630.3, Office Action dated Dec. 22, 2014", with English translation of claims, 10 pgs.
"Chinese Application Serial No. 201180055630.3, Response filed Apr. 20, 2015 to Office Action dated Dec. 22, 2014", w/ English Claims, 10 pgs.
"Chinese Application Serial No. 201180055792.7, Office Action dated Dec. 22, 2014", with English translation of claims, 10 pgs.
"Chinese Application Serial No. 201180055792.7, Response filed May 5, 2015 to Office Action dated Dec. 22, 2014", w/ English Claims, 15 pgs.
"Chinese Application Serial No. 201180055794.6, Office Action dated Dec. 17, 2014", with English translation of claims, 9 pgs.
"Chinese Application Serial No. 201180055794.6, Response filed May 4, 2015 to Office Action dated Dec. 17, 2014", w/ English Claims, 15 pgs.
"Chinese Application Serial No. 201180055823.9, Office Action dated Mar. 19, 2015", w/ English Claims, 8 pgs.
"Chinese Application Serial No. 201180055845.5, Office Action dated Mar. 4, 2015", w/ English Claims, 8 pgs.
"Chinese Application Serial No. 2013101188456, Response filed Jan. 21, 2015", with English translation of claims, 16 pgs.
"Chinese Application Serial No. 201310119472.4, Response filed Jan. 21, 2015", with English translation of claims, 16 pgs.
"Chinese Application Serial No. 201310119730.9, Office Action dated May 4, 2015", w/ English Claims, 8 pgs.
"Chinese Application Serial No. 201310127961.4, Office Action dated May 6, 2015", w/ English Claims, 7 pgs.
"Chinese Application Serial No. 201380007588.7, Response filed Oct. 24, 2014", with English translation, 3 pgs.
"Chinese Application Serial No. 201380007615.0, Response filed Oct. 24, 2014", with English translation, 3 pgs.
"European Application Serial No. 11826067.8, Response filed Apr. 27, 2015 to Extended European Search Report dated Oct. 6, 2014", 32 pgs.
"European Application Serial No. 11826068.6, Response filed Feb. 9, 2015", 30 pgs.
"European Application Serial No. 11826071.0, Examination Notification Art. 94(3) dated Dec. 11, 2014", 4 pgs.
"European Application Serial No. 11826071.0, Response filed Apr. 13, 2015 to Examination Notification Art. 94(3) dated Dec. 11, 2014", 5 pgs.

(56) References Cited

OTHER PUBLICATIONS

"European Application Serial No. 13001695.9, Extended European Search Report dated Jan. 22, 2015", 8 pgs.
"European Application Serial No. 13001719.7, Response filed Jan. 21, 2015", 29 pgs.
"U.S. Appl. No. 12/849,742, Response filed Jan. 23, 2012 to Non Final Office Action dated Aug. 23, 2012", 10 pgs.
"U.S. Appl. No. 12/849,787, Non Final Office Action dated May 28, 2013", 18 pgs.
"U.S. Appl. No. 12/947,543, Notice of Allowance dated Dec. 17, 2012", 11 pgs.
"U.S. Appl. No. 13/813,443, Preliminary Amendment dated Jan. 31, 2013", 3 pgs.
"U.S. Appl. No. 13/821,586, Preliminary Amendment dated Mar. 8, 2013", 6 pgs.
"U.S. Appl. No. 13/821,589, Preliminary Amendment dated Mar. 8, 2013", 6 pgs.
"U.S. Appl. No. 13/821,598, Preliminary Amendment dated Mar. 8, 2013", 7 pgs.
"U.S. Appl. No. 13/821,609, Preliminary Amendment dated Mar. 8, 2013", 3 pgs.
"U.S. Appl. No. 13/821,612, Preliminary Amendment dated Mar. 8, 2013", 3 pgs.
"U.S. Appl. No. 13/821,619, Preliminary Amendment dated Mar. 8, 2013", 3 pgs.
"U.S. Appl. No. 13/821,793, Preliminary Amendment dated Mar. 8, 2013", 3 pgs.
"U.S. Appl. No. 13/821,842, Preliminary Amendment dated Mar. 8, 2013", 3 pgs.
"U.S. Appl. No. 13/821,853, Preliminary Amendment dated Mar. 8, 2013", 3 pgs.
"Application Serial No. PCT/US2011/051994, International Republished Application dated Jun. 7, 2012", 1 pg.
"DigiSiMic™ Digital Silicon Microphone Pulse Part Number: TC100E", TC100E Datasheet version 4.2 DigiSiMic™ Digital Silicon Microphone. (Jan. 2009), 6 pgs.
"EPCOS MEMS Microphone With TSV", 1 pg.
"International Application Serial No. PCT/US2011/051994, International Preliminary Report on Patentability dated Mar. 28, 2013", 8 pgs.
"International Application Serial No. PCT/US2011/052340, International Preliminary Report on Patentability dated Apr. 4, 2013", 5 pgs.
"International Application Serial No. PCT/US2011/052340, Search Report dated Feb. 29, 2012", 3 pgs.
"International Application Serial No. PCT/US2011/052340, Written Opinion dated Feb. 29, 2012", 3 pgs.
"International Application Serial No. PCT/US2011/052369, International Preliminary Report on Patentability dated Apr. 4, 2013", 5 pgs.
"International Application Serial No. PCT/US2013/021411, International Search Report dated Apr. 30, 2013", 5 pgs.
"International Application Serial No. PCT/US2013/021411, Written Opinion dated Apr. 30, 2013", 5 pgs.
"International Application Serial No. PCT/US2013/023877, International Search Report dated May 14, 2013", 3 pgs.
"International Application Serial No. PCT/US2013/023877, Written Opinion dated May 14, 2013", 5 pgs.
"International Application Serial No. PCT/US2013/024149, Written Opinion mailed", 4 pages.
"International Application Serial No. PCT/US2013/024149, International Search Report mailed", 7 pages.
"T4020 & T4030 MEMS Microphones for Consumer Electronics", Product Brief 2010, Edition Feb. 2010, (2010), 2 pgs.
Acar, Cenk, et al., "Chapter 4: Mechanical Design of MEMS Gyroscopes", MEMS Vibratory Gyroscopes: Structural Approaches to Improve Robustness, Springer, (2009), 73-110.
Acar, Cenk, et al., "Chapter 6: Linear Multi DOF Architecture—Sections 6.4 and 6.5", MEMS Vibratory Gyroscopes: Structural Approaches to Improve Robustness, Springer, (2009), 158-178.
Acar, Cenk, et al., "Chapter 7: Torsional Multi-DOF Architecture", MEMS Vibratory Gyroscopes: Structural Approaches to Improve Robustness, Springer, (209), 187-206.
Acar, Cenk, et al., "Chapter 8: Distributed-Mass Architecture", MEMS Vibratory Gyroscopes: Structural Approaches to Improve Robustness, Springer, (2009), 207-224.
Acar, Cenk, et al., "Chapter 9: Conclusions and Future Trends", MEMS Vibratory Gyroscopes: Structural Approaches to Improve Robustness, Springer, (2009), 225-245.
Krishnamurthy, Rajesh, et al., "Drilling and Filling, but not in your Dentist's Chair a look at some recent history of multi-chip and through silicon via (TSV) technology", Chip Design Magazine, (Oct./Nov. 2008), 7 pgs.
U.S. Appl. No. 12/947,543, U.S. Pat. No. 8,421,168, filed Nov. 16, 2010, Microelectromechanical Systems Microphone Packaging Systems.
U.S. Appl. No. 12/849,742, filed Aug. 3, 2010, Micromachined Inertial Sensor Devices.
U.S. Appl. No. 12/849,787, filed Aug. 3, 2010, Micromachined Devices and Fabricating the Same.
U.S. Appl. No. 13/821,793, filed Mar. 8, 2013, Micromachined Monolithic 6-Axis Inertial Sensor.
U.S. Appl. No. 13/821,609, filed Mar. 8, 2013, Multi-Die MEMS Package.
U.S. Appl. No. 13/821,586, filed Mar. 8, 2013, Packaging to Reduce Stress on Microelectromechanical Systems.
U.S. Appl. No. 13/821,842, filed Mar. 8, 2013, Micromachined Monolithic 3-Axis Gyroscope with Single Drive.
U.S. Appl. No. 13/821,853, filed Mar. 8, 2013, Micromachined 3-Axis Accelerometer With a Single Proof-Mass.
U.S. Appl. No. 13/821,589, filed Mar. 8, 2013, Sealed Packaging for Microelectromechanical Systems.
U.S. Appl. No. 13/813,443, filed Jan. 31, 2013, Flexure Bearing to Reduce Quadrature for Resonating Micromachined Devices.
U.S. Appl. No. 13/821,612, filed Mar. 8, 2013, Through Silcon Via With Reduced Shunt Capacitance.
U.S. Appl. No. 13/821,598, filed Mar. 8, 2013, Microelectromechanical Pressure Sensor Including Reference Capacitor.
U.S. Appl. No. 13/821,619, filed Mar. 8, 2013, Inertial Sensor Mode Tuning Circuit.
"U.S. Appl. No. 12/849,742, Supplemental Notice of Allowability dated Mar. 17, 2014", 3 pgs.
"U.S. Appl. No. 12/849,742, Supplemental Notice of Allowability dated May 5, 2014", 2 pgs.
"U.S. Appl. No. 12/849,787, Supplemental Notice of Allowability dated Mar. 21, 2014", 3 pgs.
"U.S. Appl. No. 13/362,955, Non Final Office Action dated Apr. 15, 2014", 9 pgs.
"U.S. Appl. No. 13/363,537, Response filed Jun. 6, 2014 to Non Final Office Action dated Feb. 6, 2014", 11 pgs.
"U.S. Appl. No. 13/742,942, Supplemental Notice of Allowability dated Apr. 10, 2014", 2 pgs.
"U.S. Appl. No. 13/755,841, Notice of Allowance dated May 7, 2014", 8 pgs.
"U.S. Appl. No. 13/755,841, Preliminary Amendment filed Oct. 10, 2013", 10 pgs.
"U.S. Appl. No. 13/755,841, Response filed Apr. 21, 2014 to Restriction Requirement dated Feb. 21, 2014", 7 pgs.
"U.S. Appl. No. 13/821,589, Restriction Requirement dated Apr. 11, 2014", 10 pgs.
"Chinese Application Serial No. 2010800423190, Office Action dated Mar. 26, 2014", 10 pgs.
"Chinese Application Serial No. 201180053926.1, Response filed Apr. 29, 2014 to Office Action dated Jan. 13, 2014", w/English Claims, 10 pgs.
"Chinese Application Serial No. 201180055029.4, Response filed May 27, 2014 to Office Action dated Jan. 13, 2014", w/English Claims, 29 pgs.
"Chinese Application Serial No. 201180055309.5, Office Action dated Mar. 31, 2014", w/English Claims, 7 pgs.

(56) References Cited

OTHER PUBLICATIONS

"Chinese Application Serial No. 201320172366.8, Response filed Mar. 18, 2014 to Office Action dated Jan. 30, 2014", w/English Claims, 20 pgs.
"Chinese Application Serial No. 201320565239.4, Response filed Mar. 31, 2014 to Office Action dated Jan. 16, 2014", w/English Claims, 38 pgs.
"European Application Serial No. 118260070.2, Office Action dated Mar. 12, 2014", 1 pg.
"European Application Serial No. 11826070.2, Extended European Search Report dated Feb. 12, 2014", 5 pgs.
"European Application Serial No. 11826071.0, Extended European Search Report dated Feb. 20, 2014", 6 pgs.
"European Application Serial No. 11826071.0, Office Action dated Mar. 12, 2014", 1 pg.
"European Application Serial No. 13001692.6, Response filed Apr. 1, 2014 to Extended European Search Report dated Jul. 24, 2013", 19 pgs.
"European Application Serial No. 13001721.3, Response filed Apr. 7, 2014 to Extended European Search Report dated Jul. 18, 2013", 25 pgs.
"Korean Application Serial No. 10-2013-7009777, Response filed Apr. 28, 2014", w/English Claims, 19 pgs.
"U.S. Appl. No. 13/363,537, Final Office Action dated Jun. 27, 2014", 8 pgs.
"U.S. Appl. No. 13/742,942, Notice of Allowance dated Jan. 28, 2014", 8 pgs.
"U.S. Appl. No. 13/755,841, Supplemental Notice of Allowability dated Jun. 27, 2014", 2 pgs.
"U.S. Appl. No. 13/821,589, Non Final Office Action dated Jul. 9, 2014", 10 pgs.
"U.S. Appl. No. 13/821,589, Response to Restriction Requirement dated Apr. 11, 2014", 6 pgs.
"U.S. Appl. No. 13/821,598, Restriction Requirement dated Aug. 15, 2014", 11 pgs.
"U.S. Appl. No. 13/821,612, Non Final Office Action dated Jul. 23, 2014", 8 pgs.
"U.S. Appl. No. 13/821,853, Non Final Office Action dated Jul. 30, 2014", 10 pgs.
"U.S. Appl. No. 13/860,761, Non Final Office Action dated Aug. 19, 2014", 13 pgs.
"Chinese Application Serial No. 2010800423190, Response filed Aug. 11, 2014 to Office Action dated Mar. 26, 2014", w/English Claims, 11 pgs.
"Chinese Application Serial No. 201180054796.3, Response filed Jun. 30, 2014 to Office Action dated Jan. 16, 2014", w/English Claims, 3 pgs.
"Chinese Application Serial No. 201180055029.4, Office Action dated Jul. 2, 2014", w/English Translation, 5 pgs.
"Chinese Application Serial No. 201180055309.5, Response filed Aug. 13, 2014 to Office Action dated Mar. 31, 2014", w/English Claims, 27 pgs.
"Chinese Application Serial No. 201380007588.7, Notification to Make Rectification dated Aug. 18, 2014", 2 pgs.
"Chinese Application Serial No. 201380007615.0, Notification to Make Rectification dated Aug. 18, 2014", 2 pgs.
"European Application Serial No. 10806751.3, Response filed Jul. 24, 2014 to Office Action dated Jan. 24, 2014", 26 pgs.
"European Application Serial No. 11826068.6, Extended European Search Report dated Jul. 16, 2014", 10 pgs.
"European Application Serial No. 13001719.7, Extended European Search Report dated Jun. 24, 2014", 10 pgs.
"International Application Serial No. PCT/US2013/021411, International Preliminary Report on Patentability dated Aug. 14, 2014", 7 pgs.
"International Application Serial No. PCT/US2013/023877, International Preliminary Report on Patentability dated Aug. 14, 2014", 7 pgs.
"International Application Serial No. PCT/US2013/024138, International Preliminary Report on Patentability dated Aug. 14, 2014", 6 pgs.
"International Application U.S. Appl. No. PCT/US2013/024149, International Preliminary Report on Patentability dated Aug. 14, 2014", 6 pgs.
Sebastiano, Fabio, et al., "A 1.2-V 10-µW NPN-Based Temperature Sensor in 65-nm CMOS With an Inaccuracy of 0.2 C (3) From -70 C to 125 C", IEEE Journal of Solid-State Circuits, vol. 45, No. 12, Dec. 2010, (Dec. 1, 2010), 2591-2601.
Xia, Guo-Ming, et al., "Phase correction in digital self-oscillation drive circuit for improve silicon MEMS gyroscope bias stability", Solid-State and Integrated Circuit Technology (ICSICT), 2010 10th IEEE International Conference on, IEEE, (Nov. 1, 2010), 1416-1418.
"U.S. Appl. No. 12/849,742, Response filed Sep. 30, 2013 to Non-Final Office Action dated Mar. 28, 2013", 12 pgs.
"U.S. Appl. No. 12/849,787, Response filed Oct. 28, 2013 to Non Final Office Action dated May 28, 2013", 12 pgs.
"Chinese Application Serial No. 201180053926.1, Amendment filed Aug. 21, 2013", w/English Translation, 13 pgs.
"Chinese Application Serial No. 201180055309.5, Voluntary Amendment filed Aug. 23, 2013", w/English Translation, 13 pgs.
"Chinese Application Serial No. 201320165465.3, Office Action dated Jul. 22, 2013", w/English Translation, 2 pgs.
"Chinese Application Serial No. 201320165465.3, Response filed Aug. 7, 2013 to Office Action dated Jul. 22, 2013", w/English Translation, 39 pgs.
"Chinese Application Serial No. 201320171504.0, Office Action dated Jul. 22, 2013", w/English Translation, 3 pgs.
"Chinese Application Serial No. 201320171504.0, Response filed Jul. 25, 2013 to Office Action dated Jul. 22, 2013", w/English Translation, 33 pgs.
"Chinese Application Serial No. 201320171616.6, Office Action dated Jul. 10, 2013", w/English Translation, 2 pgs.
"Chinese Application Serial No. 201320171757.8, Office Action dated Jul. 11, 2013", w/English Translation, 2 pgs.
"Chinese Application Serial No. 201320171757.8, Response filed Jul. 25, 2013 to Office Action dated Jul. 11, 2013", w/English Translation, 21 pgs.
"Chinese Application Serial No. 201320171757.8, Response filed Jul. 26, 2013 to Office Action dated Jul. 10, 2013", w/English Translation, 40 pgs.
"Chinese Application Serial No. 201320172128.7, Office Action dated Jul. 12, 2013", w/English Translation, 3 pgs.
"Chinese Application Serial No. 201320172128.7, Response filed Aug. 7, 2013 to Office Action dated Jul. 12, 2013", w/English Translation, 39 pgs.
"Chinese Application Serial No. 201320172366.8, Office Action dated Jul. 9, 2013", w/English Translation, 3 pgs.
"Chinese Application Serial No. 201320172366.8, Response filed Sep. 16, 2013 to Office Action dated Jul. 9, 2013", w/English Translation, 24 pgs.
"Chinese Application Serial No. 201320172367.2, Office Action dated Jul. 9, 2013", w/English Translation, 2 pgs.
"Chinese Application Serial No. 201320172367.2, Response filed Sep. 16, 2013 to Office Action dated Jul. 9, 2013", w/English Translation, 24 pgs.
"Chinese Application Serial No. 201320185461.1, Office Action dated Jul. 23, 2013", w/English Translation, 3 pgs.
"Chinese Application Serial No. 201320185461.1, Response filed Sep. 10, 2013 to Office Action dated Jul. 23, 2013", w/English Translation, 25 pgs.
"Chinese Application Serial No. 201320186292.3, Office Action dated Jul. 19, 2013", w/English Translation, 2 pgs.
"Chinese Application Serial No. 201320186292.3, Response filed Sep. 10, 2013 to Office Action dated Jul. 19, 2013", w/English Translation, 23 pgs.
"European Application Serial No. 13001692.6, European Search Report dated Jul. 24, 2013", 5 pgs.
"European Application Serial No. 13001696.7, Extended European Search Report dated Aug. 6, 2013", 4 pgs.

(56) References Cited

OTHER PUBLICATIONS

"European Application Serial No. 13001721.3, European Search Report dated Jul. 18, 2013", 9 pgs.
"International Application Serial No. PCT/US2013/024138, International Search Report dated May 24, 2013", 3 pgs.
"International Application Serial No. PCT/US2013/024138, Written Opinion dated May 24, 2013", 4 pgs.
"Korean Application Serial No. 10-2013-7009775, Office Action dated Sep. 17, 2013", w/English Translation, 6 pgs.
"Korean Application Serial No. 10-2013-7009777, Office Action dated Sep. 17, 2013", w/English Translation, 8 pgs.
"Korean Application Serial No. 10-2013-7009788, Office Action dated Aug. 29, 2013", w/English Translation, 6 pgs.
"Korean Application Serial No. 10-2013-7009790, Office Action dated Jun. 26, 2013", W/English Translation, 7 pgs.
"Korean Application Serial No. 10-2013-7009790, Response filed Aug. 26, 2013 to Office Action dated Jun. 26, 2013", w/English Claims, 11 pgs.
"Korean Application Serial No. 10-2013-7010143, Office Action dated May 28, 2013", w/English Translation, 5 pgs.
"Korean Application Serial No. 10-2013-7010143, Response filed Jul. 24, 2013 to Office Action dated May 28, 2013", w/English Claims, 14 pgs.
Ferreira, Antoine, et al., "A Survey of Modeling and Control Techniques for Micro- and Nanoelectromechanical Systems", IEEE Transactions on Systems, Man and Cybernetics—Part C: Applications and Reviews vol. 41, No. 3., (May 2011), 350-364.
Fleischer, Paul E, "Sensitivity Minimization in a Single Amplifier Biquad Circuit", IEEE Transactions on Circuits and Systems. vol. Cas-23, No. 1, (1976), 45-55.
Reljin, Branimir D, "Properties of SAB filters with the two-pole single-zero compensated operational amplifier", Circuit Theory and Applications: Letters to the Editor. vol. 10, (1982), 277-297.
Sedra, Adel, et al., "Chapter 8.9: Effect of Feedback on the Amplifier Poles", Microelectronic Circuits, 5th edition, (2004), 836-864.
Song-Hee, Cindy Paik, "A MEMS-Based Precision Operational Amplifier", Submitted to the Department of Electrical Engineering and Computer Sciences MIT, [Online]. Retrieved from the Internet: <URL: http://dspace.mit.edu/bitstream/handle/1721.1/16682/57138272.pdf? . . .>, (Jan. 1, 2004), 123 pgs.
U.S. Appl. No. 14/023,869, filed Sep. 11, 2013, Through Silicon Via Including Multi-Material Fill.
"U.S. Appl. No. 13/362,955, Final Office Action dated Nov. 19, 2014", 5 pgs.
"U.S. Appl. No. 13/362,955, Response filed Aug. 15, 2014 to Non Final Office Action dated May 15, 2014", 13 pgs.
"U.S. Appl. No. 13/363,537, Examiner Interview Summary dated Sep. 29, 2014", 3 pgs.
"U.S. Appl. No. 13/363,537, Notice of Allowance dated Nov. 7, 2014", 5 pgs.
"U.S. Appl. No. 13/363,537, Response filed Sep. 29, 2014 to Final Office Action dated Jun. 27, 2014", 9 pgs.
"U.S. Appl. No. 13/821,586, Response filed Nov. 24, 2014 to Restriction Requirement dated Sep. 22, 2014", 6 pgs.
"U.S. Appl. No. 13/821,586, Restriction Requirement dated Sep. 22, 2014", 4 pgs.
"U.S. Appl. No. 13/821,589, Response filed Nov. 10, 2014 to Non Final Office Action dated Jul. 9, 2014", 15 pgs.
"U.S. Appl. No. 13/821,598, Non Final Office Action dated Nov. 20, 2014", 9 pgs.
"U.S. Appl. No. 13/821,598, Response filed Oct. 15, 2014 to Restriction Requirement dated Aug. 15, 2014", 8 pgs.
"U.S. Appl. No. 13/821,612, Response filed Oct. 23, 2014 to Non Final Office Action dated Jul. 23, 2014", 6 pgs.
"Chinese Application Serial No. 201180054796.3, Office Action dated Sep. 4, 2014", w/English Claims, 11 pgs.
"Chinese Application Serial No. 201180055029.4, Response filed Nov. 14, 2014 to Office Action dated Jul. 2, 2014", w/English Claims, 23 pgs.
"Chinese Application Serial No. 201310118845.6, Office Action dated Sep. 9, 2014", 8 pgs.
"Chinese Application Serial No. 201310119472.4, Office Action dated Sep. 9, 2014", w/English Translation, 11 pgs.
"European Application Serial No. 11826043.9, Office Action dated May 6, 2013", 2 pgs.
"European Application Serial No. 11826043.9, Response filed Nov. 4, 2013 to Office Action dated May 6, 2013", 6 pgs.
"European Application Serial No. 11826067.8, Extended European Search Report dated Oct. 6, 2014", 10 pgs.
"European Application Serial No. 11826070.2, Response filed Sep. 9, 2014 to Office Action dated Mar. 12, 2014", 11 pgs.
"European Application Serial No. 11826071.0, Response filed Sep. 19, 2014 to Office Action dated Mar. 12, 2014", 20 pgs.
"European Application Serial No. 11827347.3, Office Action dated May 2, 2013", 6 pgs.
"European Application Serial No. 11827347.3, Response filed Oct. 30, 2013 to Office Action dated May 2, 2013", 9 pgs.
"European Application Serial No. 11827384.6, Extended European Search Report dated Nov. 12, 2014", 6 pgs.
"European Application Serial No. 13001695.9, European Search Report dated Oct. 5, 2014", 6 pgs.
Dunn, C, et al., "Efficient linearisation of sigma-delta modulators using single-bit dither", Electronics Letters 31(12), (Jun. 1995), 941-942.
Kulah, Haluk, et al., "Noise Analysis and Characterization of a Sigma-Delta Capacitive Silicon Microaccelerometer", 12th International Conference on Solid State Sensors, Actuators and Microsystems, (2003), 95-98.
Sherry, Adrian, et al., "AN-609 Application Note: Chopping on Sigma-Delta ADCs", Analog Devices, [Online]. Retrieved from the Internet: <URL: http://www.analog.com/static/imported-files/application_notes/AN-609.pdf>, (2003), 4 pgs.
U.S. Appl. No. 13/362,955, filed Jan. 31, 2012, MEMS Multi-Axis Accelerometer Electrode Structure.
U.S. Appl. No. 13/363,537, filed Feb. 1, 2012, MEMS Proof Mass With Split Z-Axis Portions.
U.S. Appl. No. 13/755,841, filed Jan. 31, 2013, MEMS Multi-Axis Gyroscope With Central Suspension and Gimbal Structure.
U.S. Appl. No. 13/755,953, filed Jan. 31, 2013, MEMS Multi-Axis Gyroscope Z-Axis Electrode Structure.
U.S. Appl. No. 13/742,942, filed Jan. 16, 2013, Noise Reduction Method With Chopping for a Merged MEMS Accelerometer Sensor.
U.S. Appl. No. 13/742,994, filed Jan. 16, 2013, Self Test of MEMS Accelerometer With Asics Integrated Capacitors.
U.S. Appl. No. 13/857,349, filed Apr. 5, 2013, MEMS Device Front-End Charge Amplifier.
U.S. Appl. No. 13/746,016, filed Jan. 21, 2013, Accurate Ninety-Degree Phase Shifter.
U.S. Appl. No. 13/857,363, filed Apr. 5, 2013, MEMS Device Automatic-Gain Control Loop for Mechanical Amplitude Drive.
U.S. Appl. No. 13/765,068, filed Feb. 12, 2013, Self Test of MEMS Gyroscope With Asics Integrated Capacitors.
U.S. Appl. No. 13/860,761, filed Apr. 11, 2013, Micro-Electro-Mechanical-System (MEMS) Driver.
U.S. Appl. No. 13/860,780, filed Apr. 11, 2013, MEMS Quadrature Cancellation and Signal Demodulation.
U.S. Appl. No. 15/005,783, filed Jan. 25, 2016, Micromachined Monolithic 3-Axis Gyroscope With Single Drive.
U.S. Appl. No. 15/218,852, filed Jul. 25, 2016, Through Silicon Via Including Multi-Material Fill.
"U.S. Appl. No. 13/813,443, Non Final Office Action dated Jun. 10, 2015", 10 pgs.
"U.S. Appl. No. 13/813,443, Response filed May 22, 2015 to Restriction Requirement dated Apr. 29, 2015", 7 pgs.
"U.S. Appl. No. 13/821,586, Notice of Allowance dated Jun. 5, 2015", 6 pgs.
"U.S. Appl. No. 13/821,589, Final Office Action dated Jul. 17, 2015", 14 pgs.
"U.S. Appl. No. 13/821,598, Non Final Office Action dated Jul. 7, 2015", 9 pgs.
"U.S. Appl. No. 13/821,619, Ex Parte Quayle Action mailed Jul. 16, 2015", 8 pgs.

(56) References Cited

OTHER PUBLICATIONS

"U.S. Appl. No. 13/821,793, Non Final Office Action dated Jul. 27, 2015", 14 pgs.
"U.S. Appl. No. 13/821,842, Response filed Jun. 18, 2015 Non Final Office Action dated Mar. 18, 2015", 11 pgs.
"U.S. Appl. No. 13/821,853, Final Office Action dated Jun. 18, 2015", 7 pgs.
"U.S. Appl. No. 14/023,869, Non Final Office Action dated Jun. 15, 2015", 15 pgs.
"U.S. Appl. No. 14/658,579, Non Final Office Action dated Jul. 1, 2015", 9 pgs.
"Chinese Application Serial No. 201180044919.5, Office Action dated Jun. 25, 2015", w/ English Translation, 8 pgs.
"Chinese Application Serial No. 201180054796.3, Office Action dated Jun. 4, 2015", w/ English Translation, 7 pgs.
"Chinese Application Serial No. 201310115550.3, Office Action dated May 22, 2015", w/ English Claims, 8 pgs.
"Chinese Application Serial No. 201310119986.X, Office Action dated May 12, 2015", w/ English Claims, 14 pgs.
"Chinese Application Serial No. 201380007588.7, Office Action dated Jun. 10, 2015", w/ English Claims, 7 pgs.
"Chinese Application Serial No. 201380007615.0, Office Action dated May 6, 2015", w/ English Claims, 7 pgs.
U.S. Appl. No. 14/804,691, filed Jul. 21, 2015, Multi-Die MEMS Package.
"U.S. Appl. No. 13/742,994, Final Office Action dated Nov. 24, 2015", 11 pgs.
"U.S. Appl. No. 13/742,994, Notice of Allowance dated Jun. 21, 2016", 8 pgs.
"U.S. Appl. No. 13/742,994, Response filed Jan. 8, 2016 to Final Office Action dated Nov. 24, 2015", 8 pgs.
"U.S. Appl. No. 13/755,953, Notice of Allowance dated Oct. 28, 2015", 5 pgs.
"U.S. Appl. No. 13/755,953, Response filed Sep. 15, 2015 to Non Final Office Action dated May 14, 2015", 10 pgs.
"U.S. Appl. No. 13/813,443, Notice of Allowance dated Feb. 4, 2016", 7 pgs.
"U.S. Appl. No. 13/813,443, Response filed Oct. 13, 2015 to Non Final Office Action dated Jun. 10, 2015", 7 pgs.
"U.S. Appl. No. 13/821,589, Non Final Office Action dated Feb. 8, 2016", 9 pgs.
"U.S. Appl. No. 13/821,589, Response filed May 9, 2016 to Non Final Office Action dated Feb. 8, 2016", 7 pgs.
"U.S. Appl. No. 13/821,589, Response filed Oct. 19, 2015 to Final Office Action dated Jul. 17, 2015", 10 pgs.
"U.S. Appl. No. 13/821,598, Examiner Interview Summary dated Jul. 21, 2016", 2 pgs.
"U.S. Appl. No. 13/821,598, Examiner Interview Summary dated Jul. 28, 2016", 2 pgs.
"U.S. Appl. No. 13/821,598, Final Office Action dated Jan. 21, 2016", 9 pgs.
"U.S. Appl. No. 13/821,598, Response filed Oct. 7, 2015 to Non Final Office Action dated Jul. 7, 2015", 10 pgs.
"U.S. Appl. No. 13/821,619, Non Final Office Action dated Oct. 13, 2015", 11 pgs.
"U.S. Appl. No. 13/821,619, Response filed Sep. 16, 2015 to Ex Parte Quayle Action mailed Jul. 16, 2015", 11 pgs.
"U.S. Appl. No. 13/821,793, Notice of Allowance dated Nov. 24, 2015", 5 pgs.
"U.S. Appl. No. 13/821,793, Response filed Oct. 27, 2015 to Non Final Office Action dated Jul. 27, 2015", 12 pgs.
"U.S. Appl. No. 13/821,842, Corrected Notice of Allowance dated Oct. 19, 2015", 2 pgs.
"U.S. Appl. No. 13/821,842, Examiner Interview Summary dated Sep. 15, 2015", 3 pgs.
"U.S. Appl. No. 13/821,842, Notice of Allowance Received dated Sep. 15, 2015", 13 pgs.
"U.S. Appl. No. 13/821,842, Supplemental Notice of Allowability dated Sep. 28, 2015", 2 pgs.
"U.S. Appl. No. 13/821,853, Final Office Action dated Jan. 25, 2016", 6 pgs.
"U.S. Appl. No. 13/821,853, Notice of Allowance dated May 20, 2016", 8 pgs.
"U.S. Appl. No. 13/821,853, Response filed Apr. 25, 2016 to Final Office Action dated Jan. 25, 2016", 7 pgs.
"U.S. Appl. No. 13/821,853, Response filed Oct. 19, 2015 to Final Office Action dated Jun. 18, 2015", 8 pgs.
"U.S. Appl. No. 13/857,349, Non Final Office Action dated Oct. 8, 2015", 10 pgs.
"U.S. Appl. No. 13/857,349, Notice of Allowance dated May 6, 2016", 9 pgs.
"U.S. Appl. No. 13/857,349, Response filed Jan. 8, 2016 to Non Final Office Action dated Oct. 8, 2015", 10 pgs.
"U.S. Appl. No. 13/860,780, Non Final Office Action dated Apr. 14, 2016", 25 pgs.
"U.S. Appl. No. 13/860,780, Response filed Jul. 14, 2016 to Non Final Office Action dated Apr. 14, 2016", 12 pgs.
"U.S. Appl. No. 14/023,869 Response Filed Apr. 15, 2016 to Final Office Action dated Dec. 15, 2015", 12 pgs.
"U.S. Appl. No. 14/023,869, Examiner Interview Summary dated Apr. 19, 2016", 3 pgs.
"U.S. Appl. No. 14/023,869, Final Office Action dated Dec. 15, 2015", 14 pgs.
"U.S. Appl. No. 14/023,869, Notice of Allowance dated May 4, 2016", 8 pgs.
"U.S. Appl. No. 14/023,869, Preliminary Amendment filed Dec. 4, 2013", 3 pgs.
"U.S. Appl. No. 14/023,869, Response filed Nov. 16, 2015 to Non Final Office Action dated Jun. 15, 2015", 12 pgs.
"U.S. Appl. No. 14/658,579, Final Office Action dated Jul. 14, 2016", 6 pgs.
"U.S. Appl. No. 14/658,579, Final Office Action dated Oct. 21, 2015", 10 pgs.
"U.S. Appl. No. 14/658,579, Non Final Office Action dated Mar. 16, 2016", 5 pgs.
"U.S. Appl. No. 14/658,579, Response filed Feb. 22, 2016 to Final Office Action dated Oct. 21, 2015", 11 pgs.
"U.S. Appl. No. 14/658,579, Response Filed Jun. 16, 2016 to Non-Final Office Action dated Mar. 16, 2016", 9 pgs.
"U.S. Appl. No. 14/658,579, Response filed Oct. 1, 2015 to Non Final Office Action dated Jul. 1, 2015", 11 pgs.
"U.S. Appl. No. 15/005,783 Preliminary Amendment Filed May 26, 2016", 9 pgs.
"U.S. Appl. No. 15/218,852, Preliminary Amendment Filed Jul. 27, 2016", 7 pgs.
"U.S. Appl. No. 13/742,994, Response filed Jul. 31, 2015 to Non Final Office Action dated May 1, 2015", 12 pgs.
"Chinese Application Serial No. 201180044919.5, Office Action dated Apr. 25, 2016", w/ English Translation, 7 pgs.
"Chinese Application Serial No. 201180044919.5, Response filed May 12, 2016 to Office Action dated Apr. 25, 2016", w/ English Translation, 13 pgs.
"Chinese Application Serial No. 201180055630.3, Office Action dated May 16, 2016", (English Translation), 9 pgs.
"Chinese Application Serial No. 201180055630.3, Office Action dated Jul. 10, 2015", w/ English Translation, 8 pgs.
"Chinese Application Serial No. 201180055630.3, Office Action dated Dec. 7, 2015", W/ English Translation, 5 pgs.
"Chinese Application Serial No. 201180055630.3, Response filed Feb. 19, 2016 to Office Action dated Dec. 7, 2015", W/ English Translation of Claim, 10 pgs.
"Chinese Application Serial No. 201180055630.3, Response filed Sep. 25, 2015 to Office Action dated Jul. 10, 2015", w/ English Claims, 14 pgs.
"Chinese Application Serial No. 201180055792.7, Office Action dated Jul. 21, 2015", w/ English Translation, 5 pgs.
"Chinese Application Serial No. 201180055823.9, Office Action dated Nov. 17, 2015", w/ English Translation, 8 pgs.
"Chinese Application Serial No. 201180055823.9, Response filed Feb. 2, 2016 to Office Action dated Nov. 17, 2015", (English Translation of Claims), 15 pgs.

(56) References Cited

OTHER PUBLICATIONS

"Chinese Application Serial No. 201180055823.9, Response filed Jul. 25, 2016 to Office Action dated May 10, 2016", 17 pgs.

"Chinese Application Serial No. 201180055823.9,Response filed Aug. 3, 2015 to Office Action dated Mar. 19, 2015", w/ English Translation, 14 pgs.

"Chinese Application Serial No. 201180055845.5, Office Action dated Aug. 5, 2015", w/ English Translation, 5 pgs.

"Chinese Application Serial No. 201180055845.5, Response filed Nov. 20, 2015 to Office Action dated Aug. 5, 2015", With English Claims, 9 pgs.

"Chinese Application Serial No. 201180055845.5,Response filed Jul. 13, 2015 to Office Action dated Mar. 4, 2015", w/ English Translation, 17 pgs.

"Chinese Application Serial No. 201310115550.3, Response filed Sep. 30, 2015 to Office Action dated May 22, 2015", w/ English Claims, 15 pgs.

"Chinese Application Serial No. 201310119730.9, Office Action dated Jan. 29, 2016", w/ English Translation, 7 pgs.

"Chinese Application Serial No. 201310119730.9, Response filed Jun. 13, 2016 to Office Action dated Jan. 29, 2016", 19 pgs.

"Chinese Application Serial No. 201310119806.8, Office Action dated May 13, 2016", w/ English Translation, 8 pgs.

"Chinese Application Serial No. 201310119806.8, Office Action dated Jul. 3, 2015", w/ English Claims, 12 pgs.

"Chinese Application Serial No. 201310119806.8, Response filed Jan. 18, 2016 to Office Action dated Jul. 3, 2015", (English Translation of Claims), 11 pgs.

"Chinese Application Serial No. 201310119986.X, Office Action dated Dec. 18, 2015", w/ English Translation, 6 pgs.

"Chinese Application Serial No. 201310119986.X, Response filed Apr. 29, 2016 to Office Action dated Dec. 18, 2015", (English Translation of Claims), 14 pgs.

"Chinese Application Serial No. 201310119986.X, Response filed Sep. 25, 2015 to Office Action dated May 12, 2015", w/ English Claims, 7 pgs.

"Chinese Application Serial No. 201310120172.8, Office Action dated Nov. 3, 2015", w/ English Translation, 11 pgs.

"Chinese Application Serial No. 201310120172.8, Response filed May 18, 2016 to Office Action dated Nov. 3, 2015", with English translation of claims, 21 pgs.

"Chinese Application Serial No. 201310127961.4, Response filed Sep. 2, 2015 to Office Action dated May 6, 2015", w/ English Claims, 19 pgs.

"Chinese Application Serial No. 201310128046.7, Office Action dated Jul. 23, 2015", w/ English Translation, 7 pgs.

"Chinese Application Serial No. 201310128046.7, Response filed Oct. 14, 2015 to Office Action dated Jul. 23, 2015", w/ English Claims, 23 pgs.

"Chinese Application Serial No. 201310415336.X, Office Action dated Apr. 26, 2016", w/ English Translation, 11 pgs.

"Chinese Application Serial No. 201310415336.X, Office Action dated Jul. 3, 2015", w/ English Claims, 9 pgs.

"Chinese Application Serial No. 201310415336.X, Response filed Jan. 18, 2016 to Office Action dated Jul. 3, 2015", (English Translation of Claims), 11 pgs.

"Chinese Application Serial No. 201380007523.2, Office Action dated Dec. 31, 2015", w/ English Translation, 12 pgs.

"Chinese Application Serial No. 201380007523.2, Response filed May 31, 2016 to Office Action dated Dec. 31, 2015", with English translation of claims, 16 pgs.

"Chinese Application Serial No. 201380007577.9, Office Action dated Dec. 21, 2015", w/ English Translation, 9 pgs.

"Chinese Application Serial No. 201380007577.9, Response filed May 5, 2016 to Office Action dated Dec. 21, 2015", w/ English Claims, 17 pgs.

"Chinese Application Serial No. 201380007588.7, Response filed Oct. 26, 2015 to Office Action dated Jun. 10, 2015", w/ English Claims, 9 pgs.

"Chinese Application Serial No. 201380007615.0, Response filed Jan. 5, 2016 to Office Action dated May 6, 2015", w/ English Claims, 13 pgs.

"Chinese Application Serial No. 201380007615.0, Response filed Nov. 23, 2015 to Office Action dated May 6, 2015", With English Claims, 15 pgs.

"European Application Serial No. 11826043.9, Extended European Search Report dated Feb. 23, 2016", 6 pgs.

"European Application Serial No. 11826069.4, Extended European Search Report dated Jul. 23, 2015", 8 pgs.

"European Application Serial No. 11826069.4, Response filed Feb. 22, 2016 to Extended European Search Report dated Jul. 23, 2015", W/ English Translation, 26 pgs.

"European Application Serial No. 11827347.3, Extended European Search Report dated Jul. 31, 2015", 6 pgs.

"European Application Serial No. 11827357.2, Extended European Search Report dated Aug. 26, 2015", 4 pgs.

"European Application Serial No. 13001694.2, Extended European Search Report dated Oct. 2, 2015", 8 pgs.

"European Application Serial No. 13001695.9, Response filed Aug. 24, 2015 to Extended European Search Report dated Jan. 22, 2015", 9 pgs.

"European Application Serial No. 13001719.7, Communication Pursuant to Article 94(3) EPC dated Jul. 4, 2016", 4 pgs.

"European Application Serial No. 13001720.5, Extended European Search Report dated Aug. 20, 2015", 7 pgs.

"European Application Serial No. 13001917.7, Extended European Search Report dated Apr. 11, 2016", 5 pgs.

"European Application Serial No. 13001918.5, Extended European Search Report dated Dec. 3, 2015", 8 pgs.

"Korean Application Serial No. 2012-7005729, Office Action dated May 3, 2016", w/ English Claims, 11 pgs.

"Korean Application Serial No. 2012-7005729, Response filed Jun. 29, 2016 to Office Action dated May 3, 2016", (English Translation of Claims), 29 pgs.

"Chinese Application Serial No. 201310119730.9, Office Action dated Oct. 10, 2016", W/ English Translation, 8 pgs.

"European Application Serial No. 13001719.7, Response filed Nov. 9, 2016 to Communication Pursuant to Article 94(3) EPC dated Jul. 4, 2016", 14 pgs.

"U.S. Appl. No. 13/742,994, Notice of Allowability dated Sep. 1, 2016", 7 pgs.

"U.S. Appl. No. 13/821,589, Non Final Office Action dated Sep. 9, 2016", 7 pgs.

"U.S. Appl. No. 13/857,363, Non Final Office Action dated Aug. 5, 2016", 8 pgs.

"U.S. Appl. No. 13/860,780, Final Office Action dated Aug. 18, 2016", 25 pgs.

"U.S. Appl. No. 14/217,842, Non Final Office Action dated Sep. 9, 2016", 10 pgs.

"Chinese Application Serial No. 201180055630.3, Response filed Sep. 26, 2016 to Office Action dated May 16, 2016", (With English Translation), 15 pgs.

"Chinese Application Serial No. 201180055794.6, Voluntary Amendment filed Jul. 7, 2015", with English translation of claims, 9 pgs.

"Chinese Application Serial No. 201180055823.9, Office Action dated May 10, 2016", w/ English Translation, 8 pgs.

"Chinese Application Serial No. 201310119806.8, Response filed Sep. 28, 2016 to Office Action dated May 13, 2016", with English translation of claims, 13 pgs.

"Chinese Application Serial No. 201310120172.8, Office Action dated Aug. 1, 2016", with English translation of claims, 19 pgs.

"Chinese Application Serial No. 201310415336.X, Response filed Sep. 12, 2016 to Office Action dated Apr. 26, 2016", W/ English Translation of Claims, 13 pgs.

"Definition of baseband signal downloaded from "Tech Terms"", (Jul. 15, 2016), 1 pg.

"European Application Serial No. 11827357.2, Communication under Rule 71(3) dated Apr. 25, 2016", 36 pgs.

"European Application Serial No. 13001694.2, Response filed Apr. 26, 2016 to Office Action dated Oct. 2, 2015", 18 pgs.

(56) References Cited

OTHER PUBLICATIONS

"European Application Serial No. 13001918.5, Response filed Jul. 8, 2016 tp Office Action dated Dec. 3, 2015", 36 pgs.
"Explanation of phase shifters from "Microwaves 101"", (Aug. 4, 2016), 5 pgs.

* cited by examiner

MEMS DEVICE QUADRATURE SHIFT CANCELLATION

CLAIM OF PRIORITY

This application claims the benefit of priority to U.S. Provisional Patent Application Ser. No. 61/620,653, filed Apr. 5, 2012, hereby incorporated by reference herein in its entirety.

OVERVIEW

This document discusses, among other things, apparatus and methods for cancelation of quadrature error from a micro-electromechanical system (MEMS) device, such as a MEMS gyroscope. In certain examples, a quadrature correction apparatus can include a drive charge-to-voltage (C2V) converter configured to provide drive information of a proof mass of a MEMS gyroscope, a sense C2V converter configured to provide sense information of the proof mass, a phase-shift module configured to provide phase shift information of the drive information, a drive demodulator configured to receive the drive information and the phase shift information and to provide demodulated drive information, a sense demodulator configured to receive the sense information and the phase shift information and to provide demodulated sense information, and wherein the quadrature correction apparatus is configured to provide corrected sense information using the demodulated drive information and the demodulated sense information.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

MEMS devices, such as MEMS gyroscopes, can include a suspended proof mass that is excited by a drive to oscillate at a resonant frequency. The oscillating proof mass can include suspended proof mass sections that deflect when subjected to rotational motion. Coriolis effects can be used to explain the deflection of the proof mass sections. Capacitive sensors associated with the suspended proof mass sections can provide sensor signals indicative of the rotational motion and resulting Coriolis forces that can influence the suspended proof mass sections. In certain examples, a proof mass can often be a layer or series of layers of semiconductor material. In some examples, the proof mass can be fabricated using integrated circuit technologies and various mechanical features can be fabricated using various layer creation and etching technologies. In general, the proof mass can include irregularities that, although small, are within the normal variations of the fabrication methods used to fabricate the MEMS device.

Figure 1:
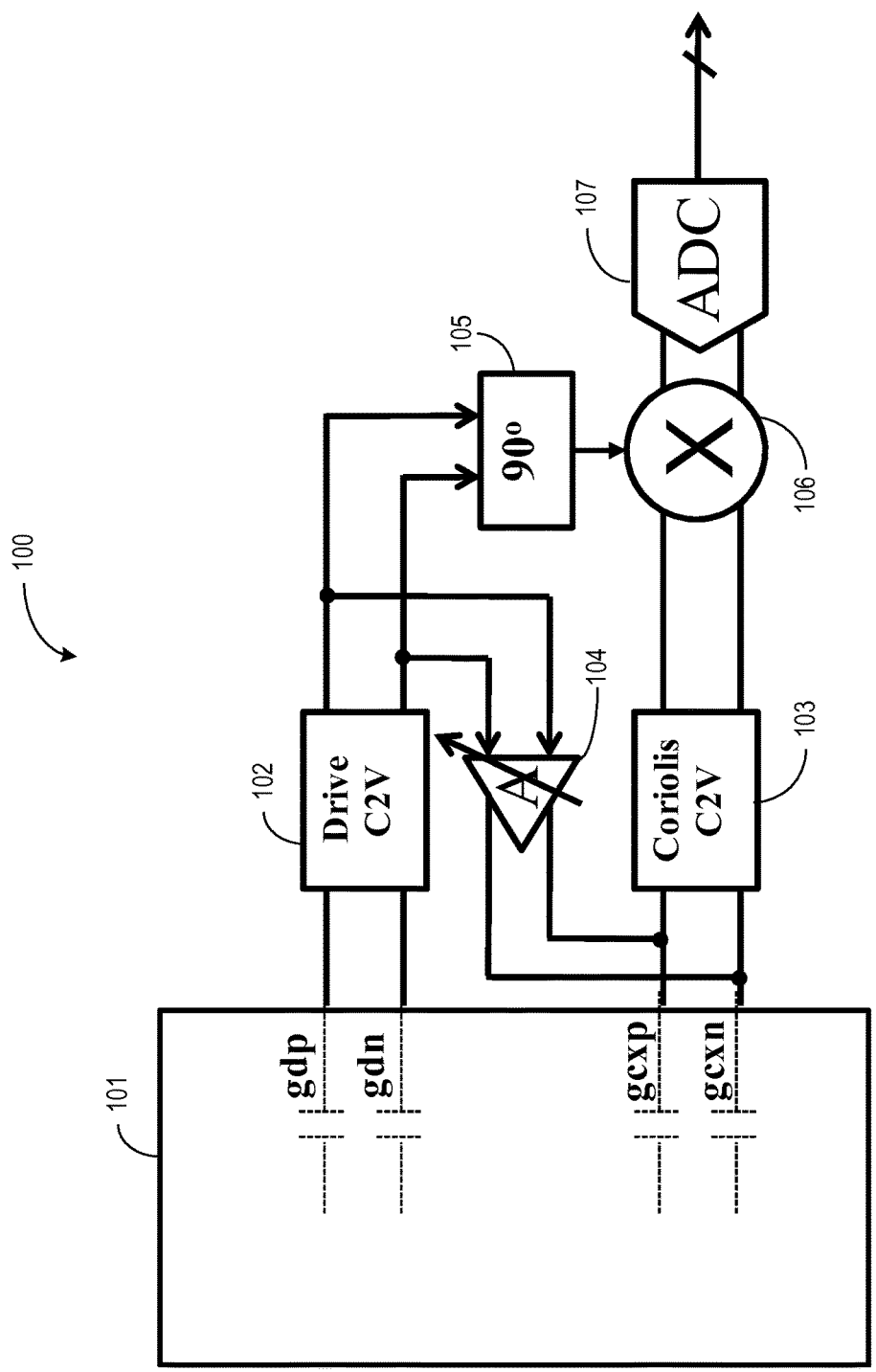
FIG. 1 illustrates an existing circuit 100 for canceling quadrature shift of a MEMS device.

FIG. 1 illustrates an existing circuit 100 for canceling quadrature shift, or quadrature error, of a MEMS device. The circuit can include a first input for coupling to drive sense electrodes (gdp, gdn) of a MEMS device such as a MEMS gyroscope 101, a second input for coupling to sensor electrodes (gcxp, gcxn) of the MEMS gyroscope 101, a drive charge-to-voltage (C2V) converter 102, a sense C2V converter 103, an analog correction amplifier 104, a 90 degree phase-shift module 105, a demodulator 106 and an analog-to-digital converter (ADC) 107.

The drive C2V converter 102 can convert charge associated with a capacitive drive electrode or set of capacitive drive electrodes (gdp, gdn) to voltage. In certain examples, a capacitive drive electrode (gdp, gdn) can be used to sense drive information including the oscillatory motion of a proof mass induce by the drive of the MEMS gyroscope 101. In some examples, the drive information received from the capacitive drive electrodes (gdp, gdn) can be used to control the oscillation of the MEMS gyroscope 101 proof mass such the proof mass oscillates at a stable frequency with a stable amplitude.

The sense C2V converter 103 can convert charge associated with capacitive sense electrodes (gcxp, gcxn) of the MEMS gyroscope 101 to voltage to provide sense information associated with the MEMS gyroscope. In certain examples, the sense information can include information associated with Coriolis effect motion of a proof mass of the MEMS gyroscope. In certain examples, a sense electrode (gcxp, gcxn) can provide a charge signal indicative of deflection of a suspended proof mass section. Deflection of a suspended proof mass section can be indicative of motion of the MEMS gyroscope 101 in a particular direction. In certain examples, a MEMS gyroscope 101 can include several sense electrodes or set of sense electrodes (gcxp, gcxn) to sense motion of the gyroscope in one or more directions. Because of irregularities associated with the fabrication of the MEMS gyroscope 101, such as irregularities associated with the proof mass, a proof mass section can deflect in a direction of sensing interest due to the oscillation of the proof mass, thus, the sense signal received from the sense electrodes (gcxp, gcxn) can include proof mass oscillation information as well as information associated with the motion of the MEMS gyroscope 101. The proof mass oscillation information received in the sense signal is what can be called quadrature shift or quadrature error.

The analog correction amplifier 104 can receive the drive sense signal from the drive C2V converter 102 and can sum an amplified version of the drive sense signal to the sense signal to substantially cancel the quadrature error in the sense signal and provide a corrected sense signal or corrected sense information.

The sense C2V converter 103 can receive the capacitive sense signal from the sense electrodes (gcxp, gcxn) having the quadrature error substantially cancelled therefrom and can convert the signal to a voltage indicative of a rate of motion of the MEMS gyroscope 101, such as a rate of rotation of the MEMS gyroscope 101. A phase-shift module 105 can be used with a demodulator 106 to demodulate the voltage signal of the sense C2V converter 103 to provide a rate output signal. In the example circuit, the ADC 107 can convert the rate output signal to a digital representation of the rate output signal for further processing.

The present inventors have recognized that quadrature cancellation circuits such as the circuit shown in FIG. 1 can be effective at reducing the quadrature error in a MEMS gyroscope sense signal, but can also introduce noise and drift in to the sense signal that can deteriorate the accuracy and performance of the motion information available from the MEMS gyroscope 101. For example, the inventors have recognized that a digital sense and quadrature cancellation circuit can reduce noise and phase drift that can be introduce from analog components of a quadrature cancellation circuit, such as noise and drift that can be introduced by the analog correction amplifier 104 of FIG. 1.

Figure 2:
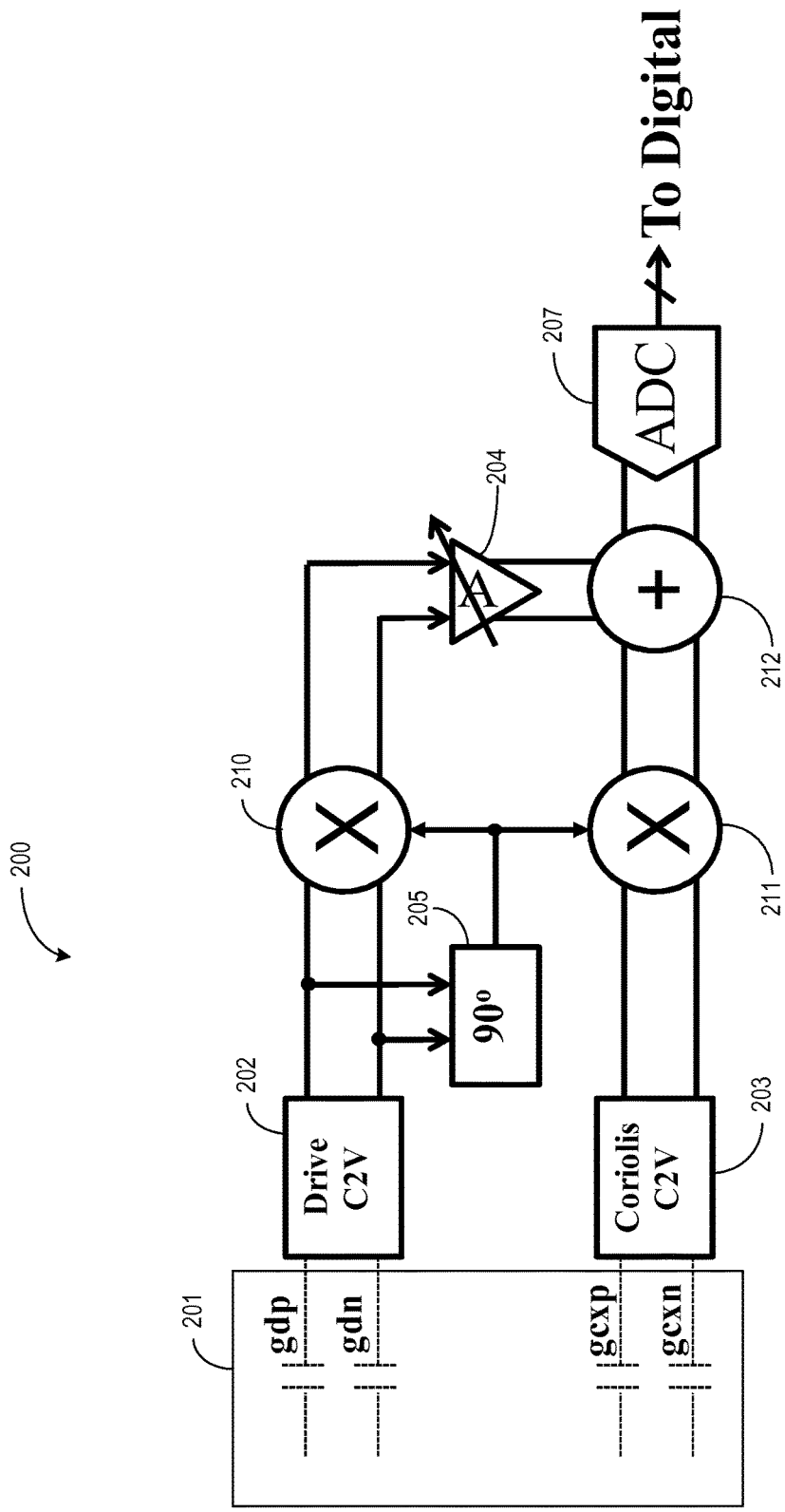
FIG. 2 illustrates generally an example sensor circuit for canceling quadrature error appearing on a MEMS gyroscope sensor signal.

FIG. 2 illustrates generally an example quadrature cancellation circuit 200 including a drive sense C2V converter 202, a sense C2V converter 203, a phase-shift module 205, drive and sense demodulators 210, 211, and a correction amplifier 204. The drive sense C2V converter 202 can convert the charge on drive sense electrodes (gdp, gdn) of the proof mass of a MEMS gyroscope 201 to provide a voltage signal indicative of the in-plane oscillation motion of the proof mass. The sense C2V converter 203 can convert the charge on the sense electrodes (gcxp, gcxn) of a suspended proof mass section of the proof mass to a voltage signal indicative of a rate of motion of the MEMS gyroscope 201. The phase-shift module 205 and the drive demodulator 210 can demodulate the drive sense signal and can provide a demodulated signal representative of the proof mass oscillation. The phase-shift module 205 and the sense demodulator 211 can demodulate the sense signal to provide a demodulated sense signal indicative of a rate of motion of the MEMS gyroscope 201. However, the demodulated sense signal can include components associated with the oscillation of the proof mass because irregularities in the fabrication of the MEMS gyroscope 201, such as irregularities in the fabrication of the semiconductor proof mass, can cause out-of-plane oscillation motion (e.g. quadrature error) that can be sensed by the sense electrodes (gcxp, gcxn) of the MEMS gyroscope 201. The correction amplifier 204 can adjust the level of the demodulated drive signal to provide amplified demodulated drive information, or a correction signal, to cancel the quadrature error in the demodulated sense signal. A summing node 212 can combine the correction signal with the demodulated sense signal to cancel the quadrature error of the demodulated sense signal. In certain examples, the demodulated and quadrature error-free sense signal can be converted to a digital representation for further processing using a ADC 207. In certain examples, the quadrature cancellation circuit 200 can reduce the opportunity for drift to be introduced into the circuit by demodulating the drive sense signal and the sense signal using nearly identical components that in certain examples can be fabricated within the same integrated circuit. Consequently, any drift introduced in one circuit path is most likely compensated by drift introduce, by the same mechanism, in the other circuit path.

Figure 3:
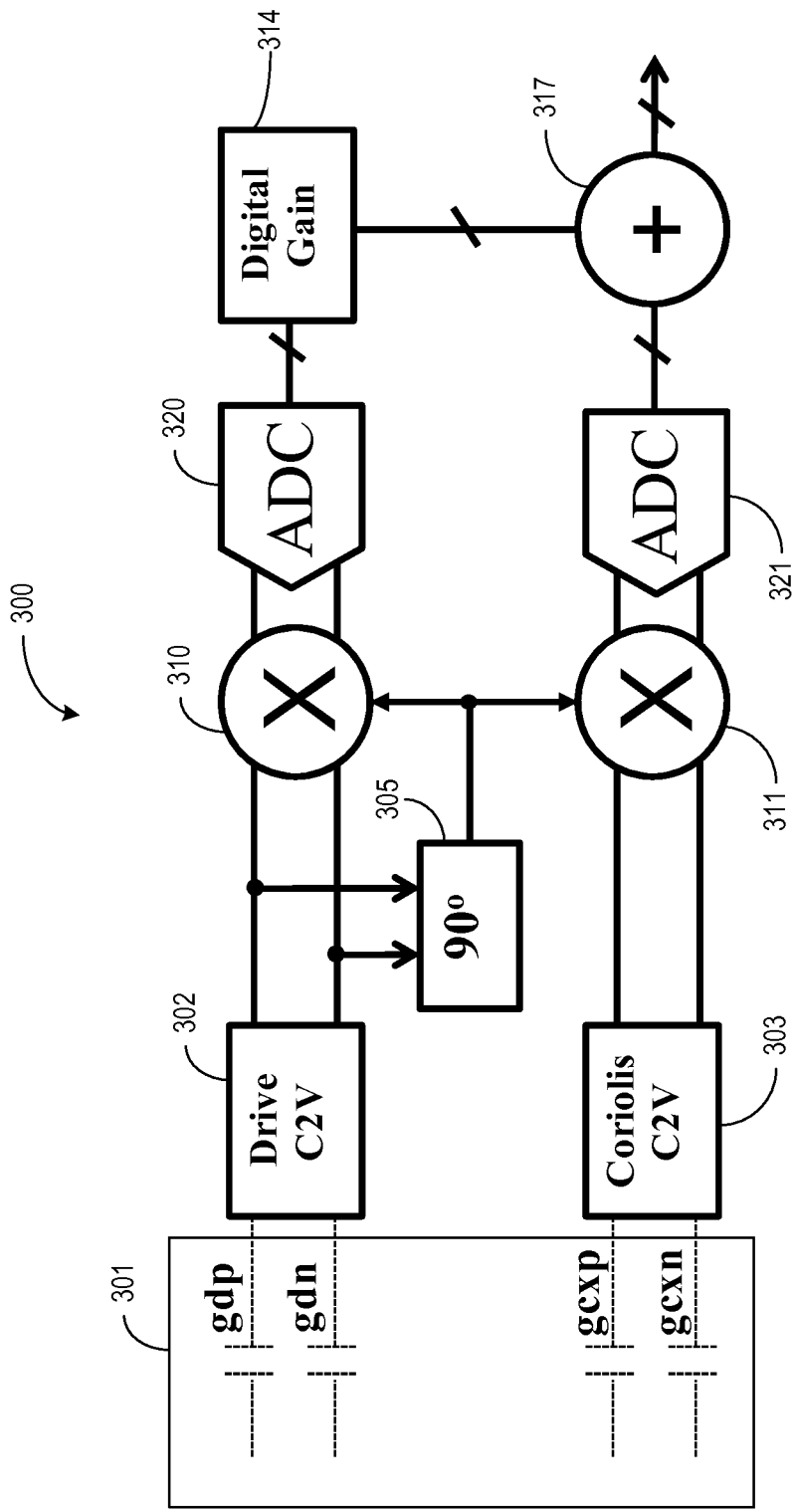
FIG. 3 illustrates generally an example quadrature cancellation circuit for a MEMS device.

FIG. 3 illustrates generally an example quadrature cancellation circuit 300 including a drive sense C2V converter 302, a sense C2V converter 303, a phase-shift circuit 305, drive and sense demodulators 310, 311, drive and sense ADCs 320, 321, and a digital correction amplifier 314. The drive sense C2V converter 302 can convert the charge on drive sense electrodes (gdp, gdn) of the proof mass of a MEMS gyroscope 301 to provide a voltage signal indicative of the in-plane oscillation motion of the proof mass. The sense C2V converter 303 can convert the charge on the sense electrodes (gcxp, gcxn) of a suspended proof mass section of the proof mass to a voltage signal indicative of a rate of motion of the MEMS gyroscope 301. The phase-shift circuit 305 and the drive demodulator 310 can demodulate the drive sense signal and can provide a demodulated signal representative of the proof mass oscillation. The phase-shift circuit 305 and the sense demodulator 311 can demodulate the sense signal to provide a demodulated sense signal indicative of a rate of motion of the MEMS gyroscope 301. The demodulated drive sense signal and the demodulated sense signal can be digitized using the drive and sense ADCs 320, 321 respectively. Converting the demodulated signals to digital representation of the demodulated signals can reduce the opportunities for noise to be introduced to the signals, for example, 1/f noise that can be common to analog signal processing components.

The digital representations of the demodulated sense signal can include components associated with the oscillation of the proof mass because irregularities in the fabrication of the MEMS gyroscope 301, such as irregularities in the fabrication of the semiconductor proof mass of the MEMS gyroscope, can cause out-of-plane oscillation motion (e.g. quadrature error) that can be sensed by the sense electrodes (gcxp, gcxn) of the MEMS gyroscope 301. In certain examples, the digital correction amplifier 314 can adjust the level of the digital representations of the demodulated drive signal to provide a digital correction signal to cancel the quadrature error in the digitized, demodulated sense signal. A digital summing node 317 can digitally combine the digital correction signal with the digital representations of the demodulated sense signal to cancel the quadrature error of the digital representations of the demodulated sense signal. In certain examples, the quadrature cancellation circuit 300 can reduce the opportunity for drift to be introduced in to the circuit by demodulating the drive sense signal and the sense signal using nearly identical components that in certain examples can be fabricated within the same integrated circuit. Consequently, any drift introduced in one circuit path is most likely compensated by drift introduced by the same mechanism, for example, in the other circuit path.

Additional Notes

In Example 1, a quadrature correction apparatus can include a drive charge-to-voltage (C2V) converter configured to provide drive information of a proof mass of a MEMS gyroscope, a sense C2V converter configured to provide sense information of the proof mass, a phase-shift module configured to provide phase shift information of the drive information, a drive demodulator configured to receive the drive information and the phase shift information and to provide demodulated drive information, a sense demodulator configured to receive the sense information and the phase shift information and to provide demodulated sense information; and wherein the quadrature correction apparatus is configured to provide corrected sense information using the demodulated drive information and the demodulated sense information.

In Example 2, the apparatus of Example 1 optionally includes a summing node configured to provide the corrected sense information using the demodulated drive information and the demodulated sense information.

In Example 3, the apparatus of any one or more of Examples 1-2 optionally includes a correction amplifier configured to receive the demodulated drive information and to provide amplified demodulated drive information, and wherein the quadrature correction apparatus is configured to provide the corrected sense information using the amplified demodulated drive information and the demodulated sense information.

In Example 4, the apparatus of any one or more of Examples 1-3 optionally includes a summing node configured to provide the corrected sense information using the amplified demodulated drive information and the demodulated sense information.

In Example 5, the apparatus of any one or more of Examples 1-3 optionally includes an analog-to-digital converter configured to receive the corrected sense signal and to provide a digital representation of the corrected sense signal.

In Example 6, the drive demodulator of any one or more of Examples 1-5 optionally includes a first analog-to-digital converter configured to receive the demodulated drive signal and to provide a digital representation of the demodulated drive signal.

In Example 7, the drive demodulator of any one or more of Examples 1-6 optionally includes a correction amplifier configured to adjust a level of the digital representation of the demodulated drive signal to provide a correction signal to cancel the quadrature error of the sensed information.

In Example 8, the sense demodulator of any one or more of Examples 1-7 optionally includes a second analog-to-digital converter configured to receive the demodulated sense signal and to provide a digital representation of the demodulated sense signal.

In example 9, the summing node of any one or more of Examples 1-8 optionally includes a digital summing node configured to combine the digital representation of the demodulated drive signal and the digital representation of the demodulated sense signal to cancel quadrature error of the demodulated sense signal, and to provide a digital, corrected sense signal.

In Example 10, a method can include providing drive information of a proof mass of a MEMS gyroscope using a drive charge-to-voltage (C2V) converter, providing sense information of the proof mass using a sense C2V converter, providing phase shift information of the drive information using the drive information and a phase-shift module, demodulating the drive information using a drive demodulator and the phase shift information to provide demodulated drive information, demodulating the sense information using a sense demodulator and the phase shift information to provide demodulated sense information, and canceling quadrature error of the sense information to provide a corrected sense signal using the demodulated drive information and the demodulated sense information.

In Example 11, the method of any one or more of Examples 1-10 optionally includes adjusting a level of the demodulated drive information using a correction amplifier In Example 12, the method of any one or more of Examples 1-11 optionally includes converting the corrected sense signal using an analog-to-digital converter to provide a digital representation of the corrected sense signal.

In Example 13, the method of any one or more of Examples 1-12 optionally includes providing a digital representation of the demodulated drive signal using the demodulated drive information and a first analog-to-digital converter.

In Example 14, the method of any one or more of Examples 1-13 optionally includes adjusting a level of the digital representation of the demodulated drive information using a correction amplifier.

In Example 15, the method of any one or more of Examples 1-14 optionally includes providing a digital representation of the demodulated sense signal using the demodulated sense information and a second analog-to-digital converter.

In Example 16, the canceling quadrature error of any one or more of Examples 1-3 optionally includes digitally summing the digital representation of the demodulated drive signal and the digital representation of the demodulated sense signal to provide a digital, corrected sense signal.

In Example 17, a system can include a MEMS device including a proof mass, and a control circuit configured to provide sense information of the proof mass. The control circuit can include a drive charge-to voltage (C2V) converter configured to couple to the proof mass and to provide drive information of the proof mass, a sense C2V converter configured to receive a sense signal from the proof mass and to provide sense information of the proof mass, a phase-shift module configured provide phase shift information using the drive information, a drive demodulator configured to receive phase shift information and an the drive information to provide a demodulated drive signal, a sense demodulator configured to the phase shift information and the sense information to provide a demodulated sense signal, and a summing node configured to cancel quadrature error of the sense information and to provide a corrected sense signal using a sum of the demodulated drive signal and the demodulated sense signal.

In Example 18, the drive demodulator of any one or more of Examples 1-17 optionally includes a correction amplifier configured to adjust a level of the demodulated drive signal to provide a correction signal to cancel the quadrature error of the sense information, and an analog to digital converter configured to receive the corrected sense signal and to provide a digital representation of the corrected sense signal.

In Example 19, the drive demodulator of any one or more of Examples 1-18 optionally includes a first analog-to-digital converter configured to receive the demodulated drive signal and to provide a digital representation of the demodulated drive signal, and wherein the drive demodulator includes a digital correction amplifier configured to adjust a level of the digital representation of the demodulated drive signal to provide a digital correction signal to cancel the quadrature error of the sensed information.

In Example 20, the sense demodulator of any one or more of Examples 1-19 optionally includes a second analog-to-digital converter configured to receive the demodulated sense signal and to provide a digital representation of the demodulated sense signal.

In Example 21, the summing node of any one or more of Examples 1-20 optionally includes a digital summing node configured to combine the digital representation of the demodulated drive signal and the digital representation of the demodulated sense signal to cancel quadrature error of the demodulated sense signal, and to provide a digital, corrected sense signal.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the functions of Examples 1 through 21.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A quadrature correction apparatus comprising:
   a drive charge-to-voltage (C2V) converter configured to provide drive information of a proof mass of a MEMS gyroscope;
   a sense C2V converter configured to provide sense information of the proof mass;
   a phase-shift circuit configured to provide phase shift information of the drive information;
   a drive demodulator configured to receive the drive information and the phase shift information and to provide demodulated drive information;
   a sense demodulator configured to receive the sense information and the phase shift information and to provide demodulated sense information;
   a summing node configured to receive the demodulated sense information from the sense demodulator; and
   a correction amplifier configured to receive the demodulated drive information from the drive demodulator and provide amplified demodulated drive information to the summing node,
   wherein the quadrature correction apparatus is configured to provide corrected sense information using the demodulated drive information and the demodulated sense information.

2. The apparatus of claim 1, wherein the summing node is configured to provide the corrected sense information using the demodulated drive information from the sense demodulator and the demodulated sense information from the correction amplifier.

3. The apparatus of claim 1, wherein the quadrature correction apparatus is configured to provide the corrected sense information using the amplified demodulated drive information and the demodulated sense information.

4. The apparatus of claim 1, including an analog-to-digital converter configured to receive the corrected sense information and to provide a digital representation of the corrected sense information.

5. The apparatus of claim 1, wherein the drive demodulator includes a first analog-to-digital converter configured to receive the demodulated drive information and to provide a digital representation of the demodulated drive information.

6. The apparatus of claim 5, wherein the drive demodulator includes a correction amplifier configured to adjust a level of the digital representation of the demodulated drive information to provide a correction signal to cancel the quadrature error of the sensed information.

7. The apparatus of claim 6, wherein the sense demodulator includes a second analog-to-digital converter configured to receive the demodulated sense information and to provide a digital representation of the demodulated sense information.

8. The apparatus of claim 7, wherein the summing node is configured to provide the corrected sense information using the demodulated drive information and the demodulated sense information, the summing node includes a digital summing node configured to combine the digital representation of the demodulated drive information and the digital representation of the demodulated sense information to cancel quadrature error of the demodulated sense information, and to provide a digital, corrected sense information.

9. The apparatus of claim 1, wherein the sense information represents a rate of motion of the MEMS gyroscope.

10. A method comprising:
providing drive information of a proof mass of a MEMS gyroscope using a drive charge-to-voltage (C2V) converter;
providing sense information of the proof mass using a sense C2V converter;
providing phase shift information of the drive information using the drive information and a phase-shift module;
demodulating the drive information using a drive demodulator and the phase shift information to provide demodulated drive information;
demodulating the sense information using a sense demodulator and the phase shift information to provide demodulated sense information;
canceling quadrature error of the sense information to provide a corrected sense signal using the demodulated drive information and the demodulated sense information; and
adjusting a level of the demodulated drive information using s correction amplifier.

11. The method of claim 10, including converting the corrected sense signal using an analog-to-digital converter to provide a digital representation of the corrected sense signal.

12. The method of claim 10, including providing a digital representation of the demodulated drive information using the demodulated drive information and a first analog-to-digital converter.

13. The method of claim 12, including adjusting a level of the digital representation of the demodulated drive information using a correction amplifier.

14. The method of claim 13, including providing a digital representation of the demodulated sense information using the demodulated sense information and a second analog-to-digital converter.

15. The method of claim 14, wherein the canceling quadrature error includes digitally summing the digital representation of the demodulated drive information and the digital representation of the demodulated sense information to provide a digital, corrected sense information.

16. A system comprising:
a MEMS device including a proof mass; and
a control circuit configured to provide sense information of the proof mass, the control circuit including:
a drive charge-to voltage (C2V) converter configured to couple to the proof mass and to provide drive information of the proof mass;
a sense C2V converter configured to receive a sense signal from the proof mass and to provide sense information of the proof mass;
a phase-shift circuit configured to provide phase shift information using the drive information;
a drive demodulator configured to receive phase shift information and the drive information and to provide a demodulated drive signal;
a sense demodulator configured to the phase shift information and the sense information to provide a demodulated sense signal;
a summing node configured to cancel quadrature error of the sense information and to provide a corrected sense signal using a sum of the demodulated drive signal and the demodulated sense signal; and
a correction amplifier configured to adjust a level of the demodulated drive signal to provide a correction signal to cancel quadrature error of the sense information.

17. The system of claim 16, further comprising:
an analog-to-digital converter configured to receive the corrected sense signal and to provide a digital representation of the corrected sense signal.

18. The system of claim 16, wherein:
the drive demodulator includes a analog-to-digital converter configured to receive the demodulated drive signal and to provide a digital representation of the demodulated drive signal; and
the correction amplifier includes a digital correction amplifier configured to adjust a level of the digital representation of the demodulated drive signal to provide a digital correction signal to cancel the quadrature error of the sensed information.

19. The system of claim 16, wherein the drive demodulator includes a first analog-to-digital converter, the sense demodulator includes a second analog-to-digital converter configured to receive the demodulated sense signal and to provide a digital representation of the demodulated sense signal.

20. The system of claim 19, wherein the summing node includes a digital summing node configured to combine the digital representation of the demodulated drive signal and the digital representation of the demodulated sense signal to cancel quadrature error of the demodulated sense signal, and to provide a digital, corrected sense signal.

* * * * *